United States Patent
Fujimoto et al.

(10) Patent No.: US 8,368,758 B2
(45) Date of Patent: Feb. 5, 2013

(54) IMAGING APPARATUS AND LIGHTING APPARATUS FOR IMAGING

(75) Inventors: Akira Fujimoto, Komaki (JP); Yukihiro Matsuura, Nagoya (JP); Tadashi Asano, Gifu (JP); Yukihiko Yoshinaga, Kariya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 743 days.

(21) Appl. No.: 12/414,459

(22) Filed: Mar. 30, 2009

(65) Prior Publication Data

US 2009/0244288 A1 Oct. 1, 2009

(30) Foreign Application Priority Data

Mar. 31, 2008 (JP) ................................ 2008-094300

(51) Int. Cl.
  *H04N 5/33* (2006.01)
(52) U.S. Cl. ..................................................... 348/164
(58) Field of Classification Search ................... 348/164
  See application file for complete search history.

(56) References Cited

U.S. PATENT DOCUMENTS

| | | | |
|---|---|---|---|
| 5,973,730 A | 10/1999 | Tranchita et al. | |
| 6,642,955 B1 | 11/2003 | Midgley et al. | |
| 7,466,847 B2 | 12/2008 | Komura | |
| 2002/0030755 A1* | 3/2002 | Uchino | 348/342 |
| 2003/0012425 A1 | 1/2003 | Suzuki et al. | |
| 2006/0164541 A1 | 7/2006 | Olmstead et al. | |
| 2006/0212202 A1 | 9/2006 | Ota | |
| 2007/0052805 A1 | 3/2007 | Inagaki et al. | |

FOREIGN PATENT DOCUMENTS

| | | |
|---|---|---|
| EP | 1 605 692 A1 | 12/2005 |
| EP | 1 718 068 A2 | 11/2006 |
| FR | 2 775 534 A1 | 9/1999 |
| JP | 6319067 A | 11/1994 |
| JP | 06319067 A * | 11/1994 |
| JP | 2004129124 A | 4/2004 |
| JP | 2005-271876 A | 10/2005 |
| JP | 2005-301742 A | 10/2005 |
| JP | 2006-248363 A | 9/2006 |

OTHER PUBLICATIONS

Eurpoean Search Report dated Jun. 4, 2009 (6 pages).
Japanese Office Action dated Feb. 7, 2012, issued in corresponding JP 2008-094300.

* cited by examiner

*Primary Examiner* — Larry Donaghue
*Assistant Examiner* — Marshall McLeod
(74) *Attorney, Agent, or Firm* — Sughrue Mion, PLLC

(57) ABSTRACT

An imaging apparatus for taking an image of a face includes an imaging element having sensitivity for a near-infrared range and a visible range, a first optical filter provided between the face and the imaging element to reduce an intensity of a visible light entering the imaging element and a near-infrared light irradiating portion for irradiating the face with a near-infrared light.

11 Claims, 16 Drawing Sheets

FIG. 9A

Direct sunlight control information  1101

| Ranges of light intensity (RKm) | Direct sunlight control coefficient (KDm) |
| --- | --- |
| 2,200~2,499 | 1.6 |
| 2,500~2,799 | 1.8 |
| 2,800~3,099 | 2 |
| 3,100~3,399 | 2.2 |

FIG. 9B

Reflection on eyeglasses control information  1102

| Ranges of light intensity (RKm) | Reflection on eyeglasses control coefficient (KGm) |
| --- | --- |
| 2,200~2,499 | 1/8 |
| 2,500~2,799 | 1/7 |
| 2,800~3,099 | 1/6 |
| 3,100~3,399 | 1/5 |

FIG. 14

Light emission controlling table 211

| Measured value Iv | First light emitting portion | | | Second light emitting portion | | |
|---|---|---|---|---|---|---|
| | LED to be lighted | Lighting time | Electric current value | LED to be lighted | Lighting time | Electric current value |
| 61 or more | No.1-12,24-36,42 | T1 | I1 | No.1-11,24-35,42 | T2 | I2 |
| 50~60 | No.1-10,27-36,46 | T3 | I3 | No.1-11,24-35,42 | T4 | I2 |
| ... | ... | ... | ... | ... | ... | ... |
| Less than 20 | No.1-5,24-30,42 | T5 | I5 | No.1-6,24-31,46 | T5 | I4 |

IMAGING APPARATUS AND LIGHTING APPARATUS FOR IMAGING

CROSS REFERENCE TO RELATED APPLICATIONS

This application is based on and claims priority under 35 U.S.C. §119 to Japanese Patent Application 2008-094300, filed on Mar. 31, 2008, the entire contents of which is incorporated herein by reference.

FIELD OF THE INVENTION

The present invention relates to an imaging apparatus and a lighting apparatus for imaging.

BACKGROUND

According to a known driver monitoring system, an image of a face of the driver is taken and processed so as to be used for executing a driving assist control. In order to appropriately execute the driving assist control by means of the driver monitoring system, the image of the driver's face needs to be appropriately taken. However, with respect to an environment where the image of driver's face is taken, because an exposure condition may vary depending on weather, season, a traveling state and the like, the exposure condition may not be stably maintained easily. Further, because in-vehicle parts such as a sun visor and a pillar may make a sharp shadow on the driver's face, it may also be difficult to capture the image appropriately by means of a camera having sensitivity for a visible range.

According to JP2005-271876A, an imaging apparatus has been disclosed in which, in order to take the image appropriately, a driver's face is irradiated with near-infrared lights emitted from upper and lower by means of LED (Light Emitting Diode). In this configuration, the image of the driver's face is taken under a circumstance where no shadow or little shadow exists on the driver's face.

Further, according to JP 2005-301742A, a verification system has been disclosed in which, the image of the driver's face is taken for a personal verification. Specifically, the image of the driver's face is taken where a near-infrared LED irradiates the driver with a light, and a driving current for light emission supplied to the near-infrared LED is controlled in order to increase the life of the near-infrared LED.

According to JP2006-248363A, another imaging apparatus has been disclosed in which a near-infrared LED is provided in a rear visual field where the driver monitors the rear visual field through a rear view mirror. The near-infrared LED irradiates an inside of the rear view mirror direction with near-infrared rays. The near infrared rays are reflected by an inside of the rear view mirror and illuminates the face of the driver.

However, as the vehicle travels fast, the exposure condition to the external light (sunlight) varies every moment. Further, the exposure condition varies depending on weather and seasonal change. Thus, the apparatuses and systems disclosed in JP2005-271876A, JP2005-301742A and JP2006-248363A may not reduce influences due to the external light. Specifically, when the near-infrared LED is not appropriately positioned, the influence of the sunlight is not diminished. For example, when a shadow is made on the driver's face due to the sunlight or the like, the face image may not be taken appropriately. Further, when the face of the driver who is wearing a reflector such as eyeglasses is irradiated with a high-intensity light such as the sunlight, the high-intensity light reflects on the reflector, and the face image may not be taken appropriately. By means of an optical band-pass filter, a visible optical element in the reflected light that enters the camera may be filtered.

Further, in methods disclosed in JP2005-271876A, JP2005-301742A and JP2006-248363A, a reference for setting the number of the near-infrared LED is not provided. Accordingly, excessive near-infrared LEDs may be provided, as a result, a level of electric power consumption may be increased.

A need thus exists for an imaging apparatus and a lighting apparatus for imaging which is not susceptible to the drawback mentioned above.

SUMMARY OF THE INVENTION

According to an aspect of the present invention, an imaging apparatus for taking an image of a face includes an imaging element having sensitivity for a near-infrared range and a visible range, a first optical filter provided between the face and the imaging element to reduce an intensity of a visible light entering the imaging element and a near-infrared light irradiating portion for irradiating the face with a near-infrared light.

According to another aspect of the present invention, the lighting apparatus for imaging irradiates a face taken by an imaging apparatus to which a first optical filter is provided at an imaging surface thereof to reduce an intensity of a visible light, the lighting apparatus for imaging including a near-infrared light irradiating portion for irradiating the face with a near-infrared light at a predetermined intensity being set on the basis of an intensity of a sunlight, assuming that the sunlight passes through the first optical filter in the vicinity of the face.

BRIEF DESCRIPTION OF THE DRAWINGS

The foregoing and additional features and characteristics of the present invention will become more apparent from the following detailed description considered with the reference to the accompanying drawings, wherein:

FIG. 9A illustrates a diagram indicating an example of a data structure of a direct sunlight control information;

FIG. 9B illustrates a diagram indicating an example of a data structure of a reflection on eyeglasses control information;

FIG. 14 illustrates a diagram indicating an example of a configuration of an light emission controlling table;

DETAILED DESCRIPTION

Figure 1:
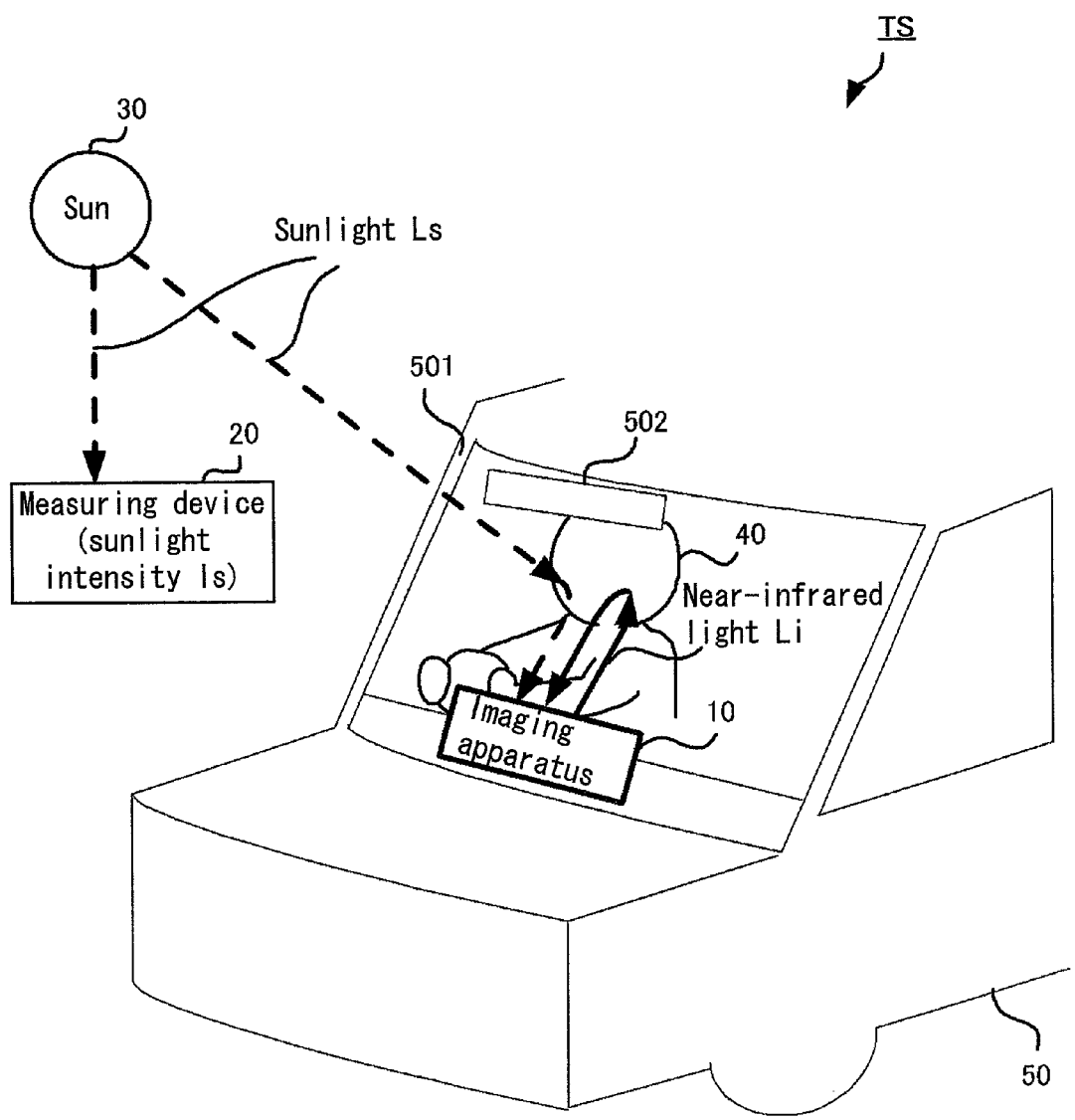
FIG. 1 illustrates a block diagram indicating an entire configuration of an imaging system related to the present invention.

A first embodiment referring to the present invention will be explained. Firstly, an imaging system TS related to the first embodiment will be explained. The imaging system TS includes an imaging apparatus, a lighting apparatus for imaging 101 and programs. As shown in FIG. 1, the imaging system TS mainly includes an imaging apparatus 10 and a measuring device 20. The imaging apparatus 10 is mounted to a vehicle, for example an automobile 50, and positioned so as to take an image of a face of a driver 40 sitting on a driver's seat. For example, the imaging apparatus 10 is positioned at an upper center of an instrument panel. The measuring device 20 is only used at a design phase, so that the measuring device 20 does not need to be mounted to the automobile 50.

In the example of the drawing illustrated in FIG. 1, a sun visor 502 is provided so as to be unfolded in order to shade the driver from the sun 30. While the automobile 50 is traveling, the sunlight Ls makes a shadow of a pillar 501 and the sun visor 502 on the face of the driver 40.

The measuring device 20 measures a light intensity of the sunlight Ls whose visible optical element is reduced by means of an optical filter. Hereinafter, the measured light intensity of the filtered sunlight Ls will be indicated as a sunlight intensity Is. A wavelength of the visible optical element that is supposed to be filtered is set to be between 380 nm and 700 nm. In this embodiment, the measuring device 20 is used at the design phase.

The imaging apparatus 10 irradiates the driver 40 with a near-infrared light Li whose intensity is set on the basis of the sunlight intensity Is measured by means of the measuring device 20. In this condition, the face of the driver 40 is taken by a charge coupled device (hereinafter referred to as a CCD camera), which has sensitivity for a near-infrared range and a visible range. The wavelength of the near-infrared light Li is set to be between 700 nm and 2,500 nm.

A configuration of the imaging apparatus 10 will be explained. As indicated in a drawing illustrated in FIG. 2A, the imaging apparatus 10 includes a CCD camera 100 (e.g., imaging element), an imaging filter 103 (e.g., first optical filter) positioned in front of the CCD camera 100 and a lighting apparatus for imaging 101. The lighting apparatus for imaging 101 includes a plurality of light emitting portions 101-$n$ (1<=n (arbitrary integer)<=N) (e.g., near-infrared light irradiating portion). At least one of the light emitting portions 101-$n$ is provided on either side of the CCD camera 100. In this embodiment, "2" is set to "n", so that the imaging apparatus 10 includes a first light emitting portion 101-1 at the left of the CCD camera 100 when it is viewed by the driver and a second light emitting portion 101-2 at the right of the CCD camera 100 when it is viewed by the driver.

The imaging filter 103 is comprised of an optical band-pass filter by which a wavelength characteristic of the light that enters the CCD camera 100 (incident light) is controlled.

For example, a visible optical element in the incident light is reduced. The CCD camera 100 having sensitivity for a near-infrared range and a visible range takes an image representing an optical image of a subject (hereinafter referred to as a subject image). For example, the CCD camera 100 takes a subject image that has been filtered through the imaging filter 103.

As illustrated in FIG. 2B, each of the light emitting portions 101-1 and 101-2 includes a plurality of light emitting elements L-m (m:1-M), and when viewed by the driver 40 sitting on the driver's seat, the light emitting elements L-m are arranged in a grid alignment on a plane. Each of the light emitting portions 101-1 and 101-2 irradiates the driver 40 with a light from each of the light emitting elements L-m. The light emitting element L-m may be arbitrarily configured as long as being able to emit the near-infrared light. According to this embodiment, each light emitting element is comprised of a near-infrared LED. The total number of the near-infrared LED provided at the light emitting portion 101 is "M" (hereinafter referred to as a LED total number).

Figure 3:
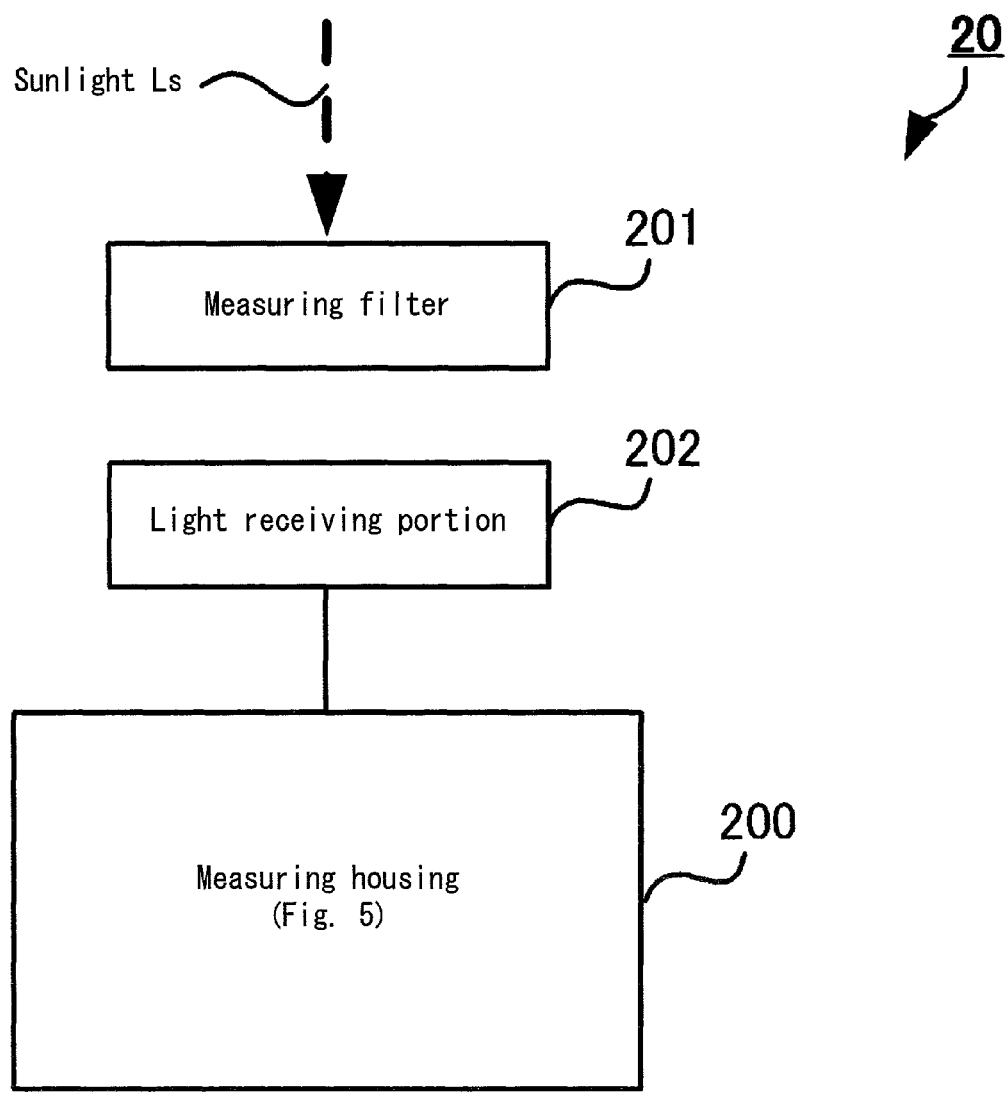
FIG. 3 illustrates a top view diagram indicating an external appearance of a measuring device.

As illustrated in FIG. 3, the measuring device 20 includes a measuring filter 201 (e.g., second optical filter), a light receiving portion 202 and a measuring housing 200. The measuring filter 201 and the light receiving portion 202 are housed in the measuring housing 200. The measuring filter 201 includes an optical band-pass filter by which the intensity of the visible light is reduced in the same manner as the imaging filter 103 provided at the imaging apparatus 10. In the first embodiment, the measuring device 20 is used at the design phase and not mounted to the automobile 50. The light receiving portion 202 includes a light receiving element such as a photo diode, a phototransistor or the like. The light receiving portion 202 receives the light passed through the measuring filter 201 at a light receiving surface thereof, executes a photoelectric conversion for the received light and generates a current signal or a voltage signal in accordance to the light intensity of the received light.

A circuit configuration of the CCD camera 100 provided at the imaging apparatus 10 and a circuit configuration of the measuring housing 200 provided at the measuring device 20 will be explained. As indicated in a drawing illustrated in FIG. 4, the CCD camera 100 includes a LED drive control portion 102, an imaging portion 104, an analog processing portion 105, a signal processing portion 106, a DAC (Digital to Analog Converter) 107, a driver 108, a controlling portion 109, a memory 110 (e.g., memorizing portion), a timing controlling portion 111, a V (Video) driver 112 and an inputting portion 113.

The LED drive control portion 102 includes a driving circuit, a controlling circuit and the like. The LED drive control portion 102 controls the near-infrared LED so as to be lighted or unlighted by supplying or stopping the driving current for light emission to each of the light emitting portions **101-*n*** illustrated in FIG. 2.

Each near-infrared LED provided each of the light emitting portions 101-1 and 101-2 emits light at a degree of light intensity Ir (hereinafter referred to as an infrared light intensity Ir) that corresponds to the supplied driving current for light emission.

The LED drive control portion 102 controls the near-infrared LED so as to emit light at a specific timing by following an instruction of a light emission control signal from the timing controlling portion 111.

The imaging portion 104 includes a solid-state imaging element such as a CCD (Charge Coupled Devices) imaging element, an electronic shutter and the like. The imaging portion 104 takes an image of a subject image, which has passed through the imaging filter 103, on a light receiving flat surface of the CCD imaging element. Then, the imaging portion 140 executes a photoelectric conversion by which an electric charge generated by the CCD imaging element in proportion to the light intensity of the subject image is converted into a voltage, and finally an analog image signal (electric signal) indicating the subject image is outputted.

Because the CCD camera 100 has a lens with fixed aperture, the imaging portion 104 is controlled so as to be exposed in a manner where an exposure amount of the CCD imaging element is adjusted by changing an electronic shutter speed Vs (electric charge accumulating time tc of the CCD imaging element) under the control of the controlling portion 109.

The analog processing portion 105 includes a correlated double sampling (CDS), an auto gain control (AGC) and an analog to digital converter (ADC). The analog processing portion 105 applies sampling or de-noising to an analog image signal outputted from the imaging portion 104 by means of the CDS, then the AGC adjusts a gain of the analog image signal to an appropriate level, and the ADC converts the analog image signal into the digital image signal.

The signal processing portion 106 executes a predetermined digital signal process to the digital image signal outputted from the analog processing portion 105, and the processed signal is outputted to the controlling portion 109 and the DAC 107. For example, the signal processing portion 106 may convert the digital image signal into some format images such as a NTSC format image, and the signal processing portion 106 may execute an auto white balance (AWB) process to the digital image signal in order to adjust the white balance thereof.

The DAC 107 converts the digital image signal outputted from the signal processing portion 106 into an analog image signal. The driver 108 outputs the analog image signal sent from the DAC 107 to an external display device (not shown).

The controlling portion 109 includes a micro processing unit and the like that controls entire operations of the imaging apparatus 10. For example, the controlling portion 109 executes an automatic exposure (AE) control in order to adjust a level of the output from the signal processing portion 106 to be a desired output level. This automatic exposure control function may be turned on or off by a user.

When the automatic exposure control function is turned on, the controlling portion 109 controls the electronic shutter speed Vs of the imaging portion 104 and a signal gain adjusted by the AGC of the analog processing portion 105, on the basis of a level of brightness of the subject image. For example, when the level of the brightness of the subject image is too low to set the electronic shutter speed Vs appropriately, by adjusting the level of the analog image signal outputted from the CCD imaging element, an average value (integrated value) of a signal output is converged to a fixed value, as a result, an inappropriate exposure due to an underexposure can be corrected.

The memory 110 stores various types of data. For example, a control program of the controlling portion 109, a face image of the driver 40 taken by the imaging portion 104 and the like are stored in the memory 110. The memory 110 may include either a memory embedded in the CCD camera 100 or a detachable external memory.

The timing controlling portion 11 includes a timing generator and the like. The timing generator generates a drive control signal of the CCD imaging element on the basis of a clock generated by a timing controlling circuit and provides the drive control signal to the imaging portion 104 by means of the V driver 112. The drive control signal includes a timing signal for controlling the CCD imaging element to start and end an integration (start and end an exposure of the CCD imaging element), a read control signal (transfer signal) of the electric charge accumulated in the CCD imaging element and the like. The electric charge accumulated in the CCD imaging element is transferred in a specific transferring type such as an interline transfer (IT) type or a full-frame transfer (FFT) type.

The timing controlling portion 111 supplies a light emission control signal to the LED drive control portion 102 in order to control a timing of a light emission from the near-infrared LED.

The V driver 112 supplies a clock pulse to the CCD imaging element of the imaging portion 104 in accordance with the timing signal outputted from the timing controlling portion 111.

The inputting portion 113 includes various types of keys and switches that are operated by a user, and the inputting portion 113 transmits an operation signal of the user operation to the controlling portion 109. For example, a slide switch is provided at the inputting portion 113 by which the automatic exposure control function is turned on or off.

Figure 5:
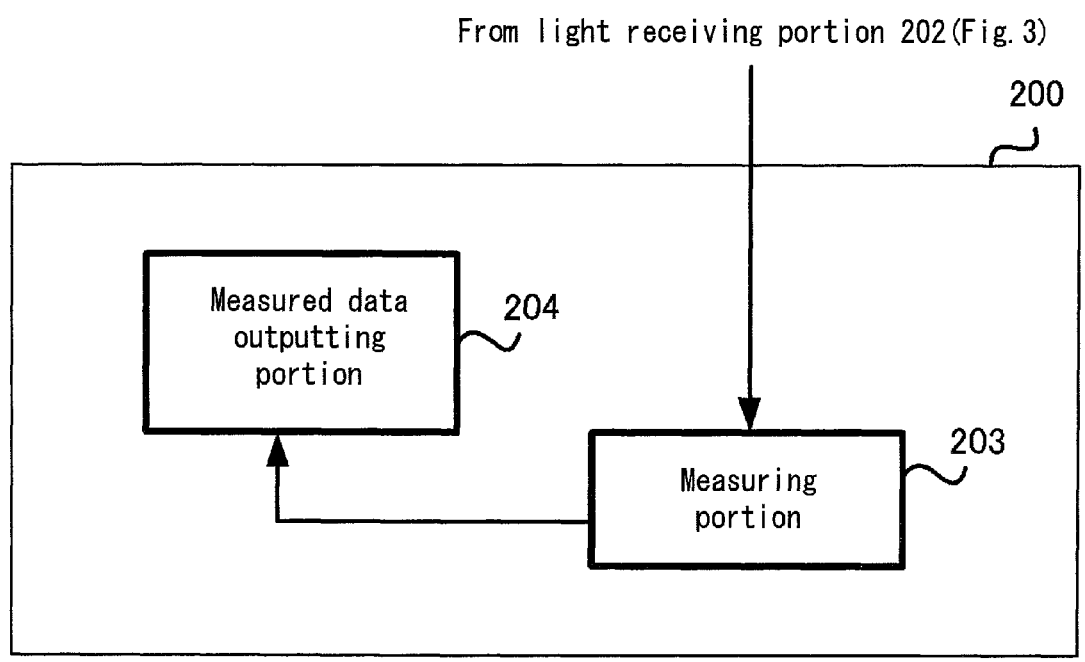
FIG. 5 illustrates a diagram indicating a circuit configuration of a measuring housing provided at a measuring device.

A circuit configuration of the measuring housing 200 will be explained. As illustrated in FIG. 5, the measuring housing 200 includes a measuring portion 203 and a measured data outputting portion 204.

The measuring portion 203 includes a current-voltage converter, and a current signal outputted from the light receiving portion 202 illustrated in FIG. 3 is converted into a voltage signal, and the a current level of the current signal is measured by the measuring portion 203. The measured data outputting portion 204 includes a dot-matrix type LCD (liquid crystal display) panel, a driver circuit and the like, and data indicating the sunlight intensity Is measured by the measuring portion 203 is displayed on the LCD panel.

In order to control a direct light and a reflection on eye-glasses in a characteristic manner, the number, current values and alignments of the near-infrared LEDs provided at each of the first light emitting portion 101-1 and the second light emitting portion 101-2 are set on the basis of a level of the sunlight intensity Is that is previously measured by the measuring device 20. A process for determining the number, the current values and the alignment of the near-infrared LEDs elated to this embodiment will be explained below.

"Controlling the direct sunlight" indicates a reduction of an influence caused by a shade generated by the direct sunlight when the face image of the driver 40 is taken by a camera having sensitivity for the near-infrared range and the visible range. This control will be referred to as a direct sunlight control.

"Controlling the reflection on the eye-glasses" indicates a reduction of an influence caused by the sunlight reflected on eye-glasses of the driver 40 or in-car glasses when the face image of the driver 40 is taken by the camera having sensitivity for the near-infrared range and the visible range. This control will be referred to as a reflection on eyeglasses control. The reflected light will also be referred to as an indirect light.

An actuation of the measuring device 20 for measuring the sunlight intensity Is will be explained. Firstly, the sunlight Ls passes through the measuring filter 201 of the measuring device 20 so that visible optical elements in the sunlight Ls are filtered. Then, the light receiving portion 202 receives the sunlight Ls that has passed through the measuring filter 201 on the light receiving surface, photoelectric conversion is applied to the received sunlight Ls, and then the converted sunlight Ls is outputted to the measuring portion 203.

Figure 6:
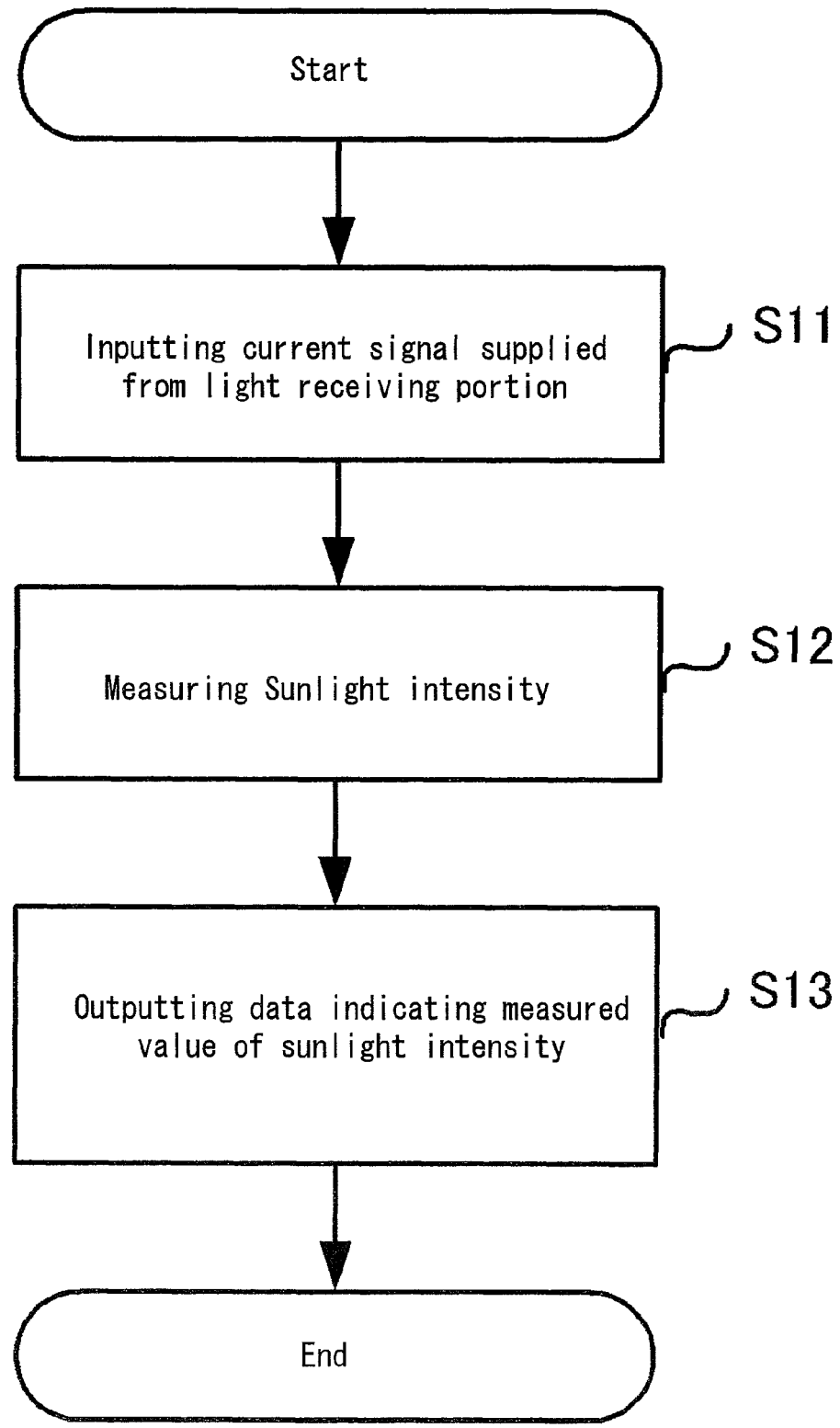
FIG. 6 illustrates a flowchart indicating a process for measuring a sunlight intensity Is by the measuring housing provided at the measuring device.

The sunlight intensity Is is measured as follows. As illustrated in FIG. 6, when a current signal is supplied from the light receiving portion 202 (Step S11), the measuring portion 203 converts the current signal into a voltage signal, and the measuring portion 203 measures a voltage level of the voltage signal (Step S12).

The measuring portion 203 transmits data indicating the measured value of the sunlight intensity Is to the measured data outputting portion 204. Then, the measured data outputting portion 204 displays the data on the display panel (Step S13).

The level of the sunlight intensity Is determined on the basis the sunlight measured by means of the measuring device 29 may vary depending on the season. As one example, the sunlight intensity Is taken in April 2007 in Japan shows 3,000 uW/cm2.

When the face image of the driver 40 is taken under a circumstance where the face of the driver is irradiated with the near-infrared light at the experimentally observed level (infrared light intensity Ir), the influence of shade caused by the direct light is reduced if a condition indicated by Formula 1 is fulfilled. This condition will be referred to as a direct light controlling condition.

near-infrared light intensity $Ir$ >=sunlight intensity $Is*2$ 
                                                             Formula 1

Further, when the face image of the driver 40 is taken under a circumstance where the face of the driver is irradiated with the near-infrared light at the experimentally observed level (infrared light intensity Ir), the influence of the indirect light is reduced if a condition indicated by Formula 2 is fulfilled. This condition will be referred to as a reflection on eyeglasses controlling condition.

near-infrared light intensity $Ir$ >=sunlight intensity $Is*(1/6)$
                                                             Formula 2

Assuming that the infrared light intensity of one near-infrared LED is set to 100 uW/cm2 while a focal length is set to 60 cm, at least 60 units of the near-infrared LED are required to fulfill the direct light controlling condition (Formula 1). The focal length of 60 cm is equivalent to a distance from the light emitting portion 101 to the driver's face seating on the driver's seat.

On the other hand, at least 5 units of the near-infrared LED are required to fulfill the reflection on eyeglasses controlling condition (Formula 2).

In order to fulfill both of the direct light controlling condition and the reflection on eyeglasses controlling condition, the total number (LED total number M) of the near-infrared LED provided at the light emitting portions 101 (the first light emitting portion 101-1 and the second light emitting portion 101-2) may be set to 60 units or more. Thus, the total number of the near-infrared LED (LED total number M) for irradiating the face of the driver 40 may be appropriately set, as a result, an electric power consumption may be reduced.

Further, the first light emitting portion 101-1 and the second light emitting portion 101-2 are provided symmetrically relative to the CCD camera 100 (bilaterally symmetrical in FIG. 2) so that the face of the driver 40 is evenly irradiated at the equal infrared light intensity.

Thus, the number of the near-infrared LED that is provided at each light emitting portion 101-1 and 101-2 is set by dividing the LED total number M by the number N of the light emitting portion. For example, when the LED total number M is set to 60, 30 units of the near-infrared LED are provided at each of the light emitting portions 101-1 and 101-2. Even when the number N of the light emitting portion 101-$n$ is 3 or more, the number of the near-infrared LED that is provided at each light emitting portion may be set in the same way.

Thus, the face of the driver 40 is taken by the imaging apparatus 10 including the light emitting portion 101 whose configuration is determined as mentioned above. Specifically, the face of the driver 40 is irradiated by means of the first light emitting portion 101-1 and the second light emitting portion 101-2 with the near-infrared light at a predetermined infrared light intensity Ir (the light intensity Ir that fulfills the direct light controlling condition and the reflection on the eyeglasses controlling condition), and the imaging portion 104 takes the face image of the driver 40 in one frame and outputs an analog image signal that indicates the face image. Thus, the effects due to the shade caused by the direct light and the effects dues to the indirect light may be reduced, as a result, the face image is taken appropriately.

A predetermined analog-signal-process is applied by the analog processing portion 105 to the analog image signal outputted from the imaging portion 104 so as to be converted into a digital image signal. Then, a predetermined digital signal process is applied to the digital image signal by the signal processing portion 106, and the processed signal is stored into the memory 110 by means of the controlling portion 109. The driver 108 outputs the digital image signal to which the digital image process has been applied to an external display device (not shown).

As mentioned above, according to the first embodiment, on the basis of the sunlight intensity Is measured by the measuring device 20, the infrared light intensity Ir of the light emitting portion 101 is set so as to fulfill the direct light controlling condition, and the light emitting portion 101-$n$ is provided so as to fulfill the direct light controlling condition. Thus, when a camera having sensitivity for the near-infrared range and the visible range takes a face image of the driver's face on which the shade of the sunlight is generated, because the emitted light from the near-infrared LED dominates the direct light, the influence due to shade of the direct sunlight is reduced so that the face image is taken appropriately.

According to the first embodiment, on the basis of the sunlight intensity Is measured by the measuring device 20, the infrared light intensity Ir of the light emitting portion 101 is set so as to fulfill the reflection on eyeglasses controlling condition. Thus, when a camera having sensitivity for the near-infrared range and the visible range takes a face image of the driver whose eyeglasses reflect the sunlight, the near-infrared light emitted from the light emitting portion 101 dominates the indirect light, as a result, influence caused by the indirect light is reduced so that the face image is taken appropriately.

In the first embodiment, the number of the near-infrared LED provided at the light emitting portion 101-$n$ is determined on the basis of the measured sunlight intensity Is, however, an output value (electric current value) or an alignment of the near-infrared LED may be determined on the basis of the measured sunlight intensity Is. Specifically, each light emitting portion 101-*n* may be formed in a manner where the infrared light intensity Ir emitted from the light emitting portion 101-*n* fulfills the direct light controlling condition and the reflection on eyeglasses controlling condition.

Second Embodiment

Another example for fulfilling the reflection on eyeglasses controlling condition will be explained. In the first embodiment, the number, the electric current value and the alignment of the near-infrared LEDs provided at each light emitting portion 101-*n* are determined so as to deal with the reflection on the eyeglasses on the basis of the previously measured sunlight intensity Is. However, as indicated by Formula 2, in order to fulfill the reflection on eyeglasses controlling condition, the infrared light intensity Ir may not be as much as that for the direct light controlling condition (Formula 1).

In the second embodiment, a current pulse for driving the near-infrared LED so as to emit the light (light emitting drive pulse) is supplied to the near-infrared LED, and a level of the infrared light intensity Ir is increased so as to deal with the reflection on eyeglasses, as a result, the face image is taken appropriately. A time period during which the light emitting drive pulse is supplied to the light emitting portion 101 may be controlled by Pulse Width Modulation (PWM) by means of the timing controlling portion 111. Further, a current level of the light emitting drive pulse is previously determined so as to obtain the infrared light intensity Ir by which the formula 2 of the reflection on eyeglasses controlling condition is fulfilled. The actuation for driving the near-infrared LED by supplying the light emitting drive pulse so as to emit the light at the infrared light intensity Ir by which the reflection on eyeglasses controlling condition is fulfilled is referred to as a LED pulse drive.

During the LED pulse drive, if a time period during which the driver 40 is irradiated with the near-infrared light is quite short relative to a field cycle Tf, an exposure amount of the CCD imaging element is affected to a greater extend by the brightness caused by the sunlight Ls with which the driver 40 is irradiated. An exposure is executed in each field cycle Tf, in other word; the CCD imaging elements accumulates an electric charge in each field cycle Tf.

Figure 7A:
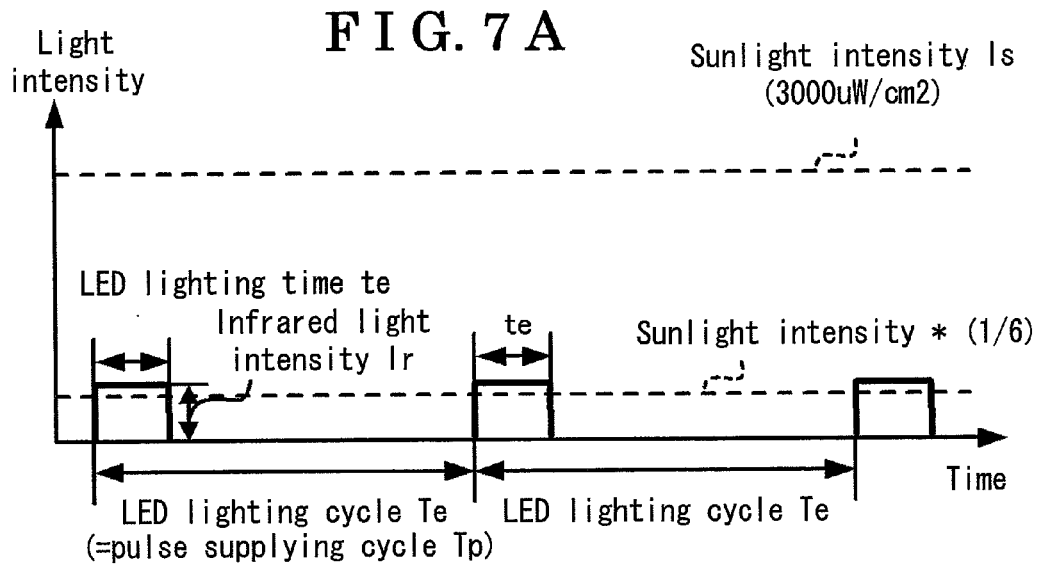
FIG. 7A illustrates a timing chart indicating an example of an actuation of a light emission of a light emitting portion.
Figure 7B:
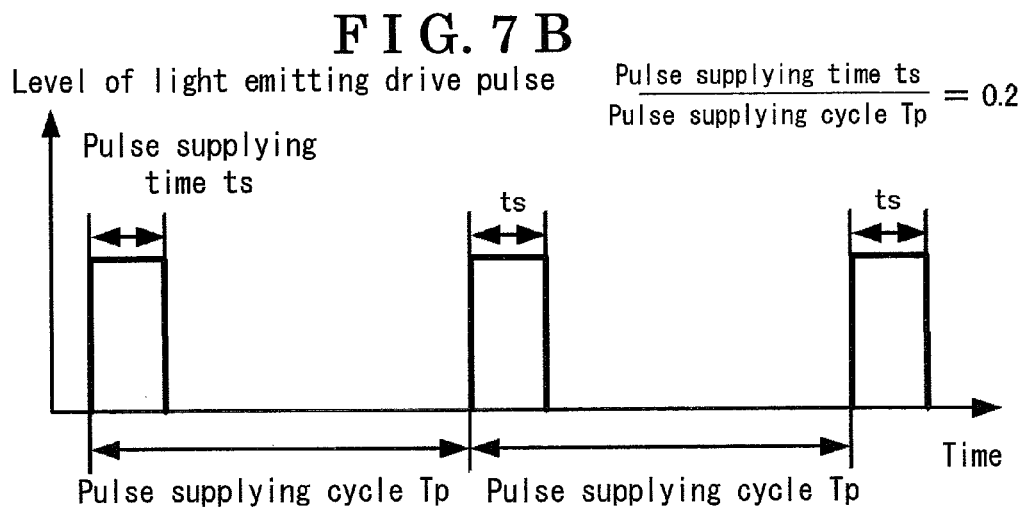
FIG. 7B illustrates a timing chart indicating an example of an actuation for supplying a light emitting drive pulse to the light emitting portion.
Figure 7C:
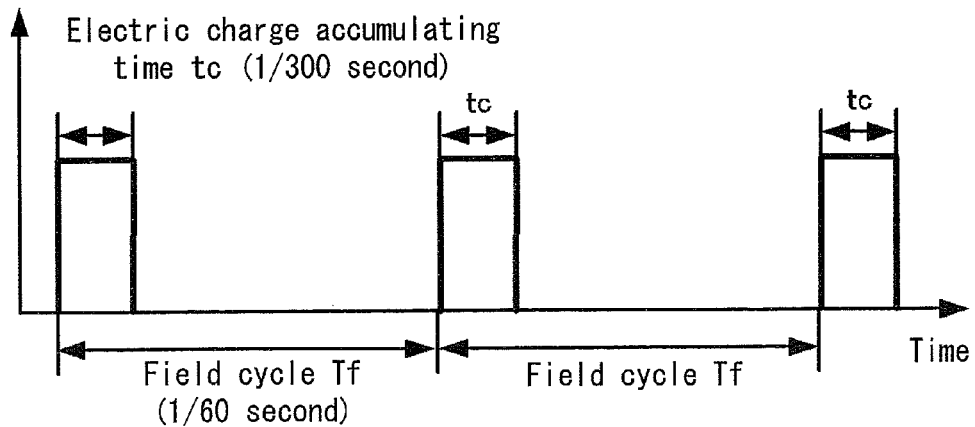
FIG. 7C illustrates a timing chart indicating an example of an imaging actuation of the imaging portion.

Specifically, when the automatic exposure control function is turned on, the controlling portion 109 determines the brightness of the subject in each field cycle Tf (e.g. ⅟60 seconds) as indicated in FIG. 7C, and then the controlling portion 109 automatically controls an electronic shutter speed Vs (electric charge accumulating time tc in which the CCD imaging element accumulates an electric charge). Accordingly, the reflection light on the eyeglasses is not reduced, as a result, even when the driver 40 is irradiated with the near-infrared light at the infrared light intensity Ir that is larger than the sunlight intensity Is, the reflection on eyeglasses is not effectively controlled.

In order to effectively control the reflection on eyeglasses, when the reflection on eyeglasses is controlled by means of the LED pulse drive, the user operates a slide switch so as to turn off the automatic exposure control function. The slide switch is provided at, for example, the inputting portion 113. In this state, the electronic shutter speed Vs may be set so as to appropriately take the face image.

When the automatic exposure control function is turned off, and the electronic shutter speed Vs is set so as to be faster than the field cycle Tf, for example, the shutter speed Vs is set to be ⅟1000 seconds and the field cycle Tf is set to be ⅟60 seconds, the face may be effectively irradiated with the near-infrared light emitted by means of the LED pulse drive, as a result, a level of the influence of the indirect light due to the reflection on eyeglasses may be reduced. However, when the face of the driver 40 is irradiated with the direct sunlight, a white portion appears in the face image due to overexposure. This white portion appears when highlighted portions in the face image are saturated, and data of the highlighted portions disappears.

When the electronic shutter speed Vs is set to be faster (e.g., ⅟5000 seconds), the brightness of the entire face image may be reduced during the driver 40 is not irradiated with the sunlight Ls.

In order to appropriately take the image of the face by arbitrarily setting the electronic shutter speed Vs during the automatic exposure control function is turned off, a time period of the LED pulse drive is set to be longer than the irradiating time period of the sunlight Ls during the CCD imaging element is exposed by means of the electronic shutter.

Therefore, in the second embodiment, as indicated in FIGS. 7A and 7C, the electric charge accumulating time tc of the CCD imaging element is set so as to be identical to a LED lighting time te during which the light emitting drive pulse is supplied to the near-infrared LED so as to be lighted. The LED lighting time te is identical to a pulse supplying time ts (FIG. 7B) during which the light emitting drive pulse is supplied to the near-infrared LED, and the LED lighting time te is set to a certain level at which heat caused by the pulse supply does not damage the near-infrared LED.

In the example illustrated in FIG. 7B, a duty ratio Rd between the pulse supplying time ts of the light emitting drive pulse and a pulse supplying cycle Tp of the light emitting drive pulse is set to 0.2. In this example, a LED lighting cycle Te in FIG. 7A, the pulse supplying cycle Tp in FIG. 7B and the field cycle Tf of the electronic shutter in FIG. 7C are synchronized.

In the example in FIG. 7C, the electronic shutter of the CCD camera 100 is actuated in each ⅟60 seconds of the field cycle Tf. Because the LED lighting cycle Te and the field cycle Tf are synchronized, the pulse supplying time ts is set to a value that is obtained by multiplying the field cycle Tf by the duty ratio Rd.

Specifically, in order to correspond the electric charge accumulating time tc (a shutter speed Vs of the electronic shutter) to the LED lighting time te (pulse supplying time ts), the electric charge accumulating time tc may be set to a value that is obtained by multiplying the field cycle Tf by the duty ratio Rd. In the example indicated in FIG. 7C, because the field cycle Tf is set to ⅟60 seconds, and the duty ratio Rd is 0.2, the electronic shutter speed Vs is set to be ⅟300 seconds (⅟60*0.2).

The electronic shutter speed Vs may be set equal to or less than the value obtained by multiplying the field cycle Tf by the duty ratio Rd of the light emitting drive pulse. However, when the electronic shutter speed Vs is set to be quite faster than the LED lighting time te, for example the electric shutter speed Vs is set to ⅟1000 seconds, ⅟5000 seconds or the like, a white portion may appear in the face image due to overexposure, and brightness of the face image may also be reduced. Accordingly, the electronic shutter speed Vs needs to be set appropriately.

Figure 8:
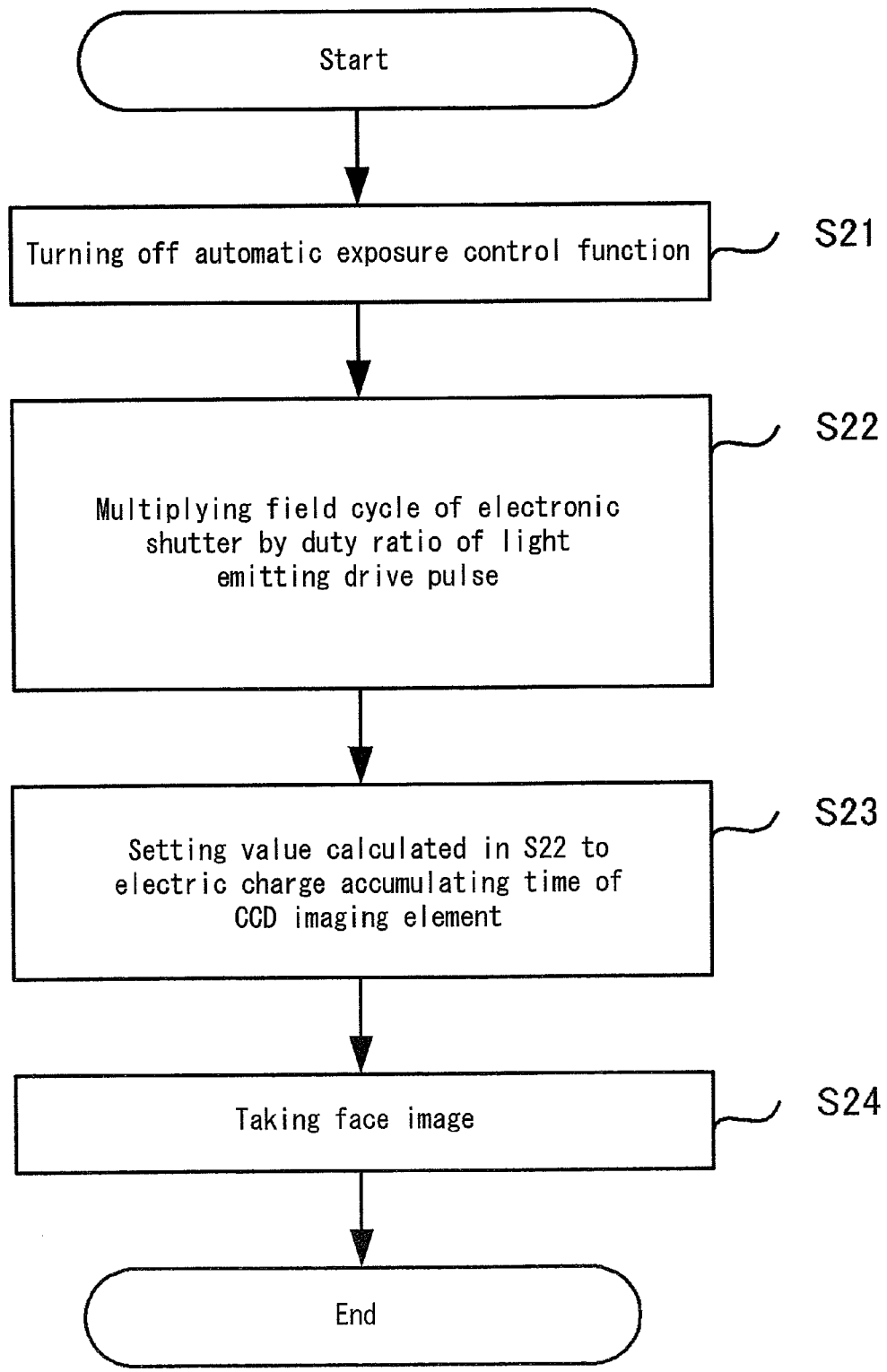
FIG. 8 illustrates a flowchart indicating a process by which actuations of a near-infrared LED and a CCD imaging element are controlled by means of the imaging apparatus related to a second embodiment.

An actuation of the imaging apparatus 10 in the second embodiment when the actuation of the electronic shutter is controlled as mentioned above will be explained. In this example, a face image of the driver 40 wearing eyeglasses is taken. As illustrated in FIG. 8, when the driver 40 is wearing the eyeglasses, the user of the imaging apparatus 10 turns off the automatic exposure control function by operating the inputting portion 113 (S21).

After the automatic exposure control function is turned off, the controlling portion 109 calculates a duty ratio Rd of the light emitting drive pulse by dividing the pulse supplying time ts by the pulse supplying cycle Tp. Then, the controlling portion 109 multiplying the field cycle Tf of the electronic shutter by the calculated duty ratio Rd (Step S22). Further, the controlling portion 109 instructs the timing controlling portion 111 so as to actuate the CCD imaging element for the electric charge accumulating time tc that is equivalent to the value calculated in Step S22.

The timing controlling portion 111 actuates the CCD imaging element for the electric charge accumulating time tc in each of the field cycle Tf that is synchronized with the pulse supplying cycle Tp (Step S23). The timing controlling portion 111 supplies the light emitting drive pulse to the light emitting portion 101 in each of the pulse supplying cycle Tp. The light emitting portion 101 emits the near-infrared light at a certain level of the infrared light intensity Ir that fulfills the reflection on eyeglasses controlling condition for the pulse supplying time ts.

The imaging portion 104 takes the face image of the driver 40 per frame under a circumstance where the driver's face is irradiated with the near-infrared light at a predetermined infrared light intensity Ir by the first light emitting portion 101-1 and the second light emitting portion 101-2 (Step S24). Then, the process is terminated.

As explained above, according to the second embodiment, when the CCD imaging element is exposed by means of the electronic shutter, a time period during which the near-infrared LED irradiates the subject (LED lighting time te) is set to be equal to or more than the irradiating time period of the sunlight Ls to the subject. Thus, a light emitting drive pulse is supplied to the near-infrared LED so as to fulfill the reflection on eyeglasses controlling condition, as a result, the face image is taken appropriately.

Modified Example

The present invention is not limited to the abovementioned embodiments and may be modified or widely applied. The abovementioned embodiments or the modified examples may be freely combined. In the embodiments, the automatic exposure control function is turned on or off by operating the imputing portion 113 by the user, however, the automatic exposure control function may be turned on or off by another method. For example, the controlling portion 109 automatically determines an existence of a person who is wearing eyeglasses in the image by means of a pattern matching by which a presence of an image that is similar to eyeglasses can be checked. In this case, when the controlling portion 109 determines the existence of the person who is wearing eyeglasses, the automatic exposure control function may be turned off.

Third Embodiment

In the first and second embodiments, the direct sunlight control and the reflection on eyeglasses control are executed by means of each of the light emitting portions 101-n in which the number, the current value and the alignment of the near-infrared LED are determined on the basis of the sunlight intensity Is that is previously measured by the measuring device 20 at the design stage.

In the third embodiment, the measuring device 20 is mounted to an automobile 50, the imaging apparatus 10 obtains the sunlight intensity Is measured by the measuring device 20, and the imaging apparatus 10 controls the first light emitting portion 101-1 and the second light emitting portion 101-2 to emit the light on the basis of the sunlight intensity Is in a manner where the direct sunlight control and the reflection on eyeglasses control are executed (the formulas 1 and 2 are fulfilled).

A configuration of the imaging system TS of the third embodiment will be explained. A system configuration of the imaging system TS according to the third embodiment is similar to the configuration indicated in FIG. 1. A basic configuration of the measuring device 20 is similar to the example indicated in FIG. 3. A circuit configuration of the measuring housing 200 according to the third embodiment is similar to the example indicated in FIG. 5. The measuring device 20 is provided at the vehicle.

Figure 2:
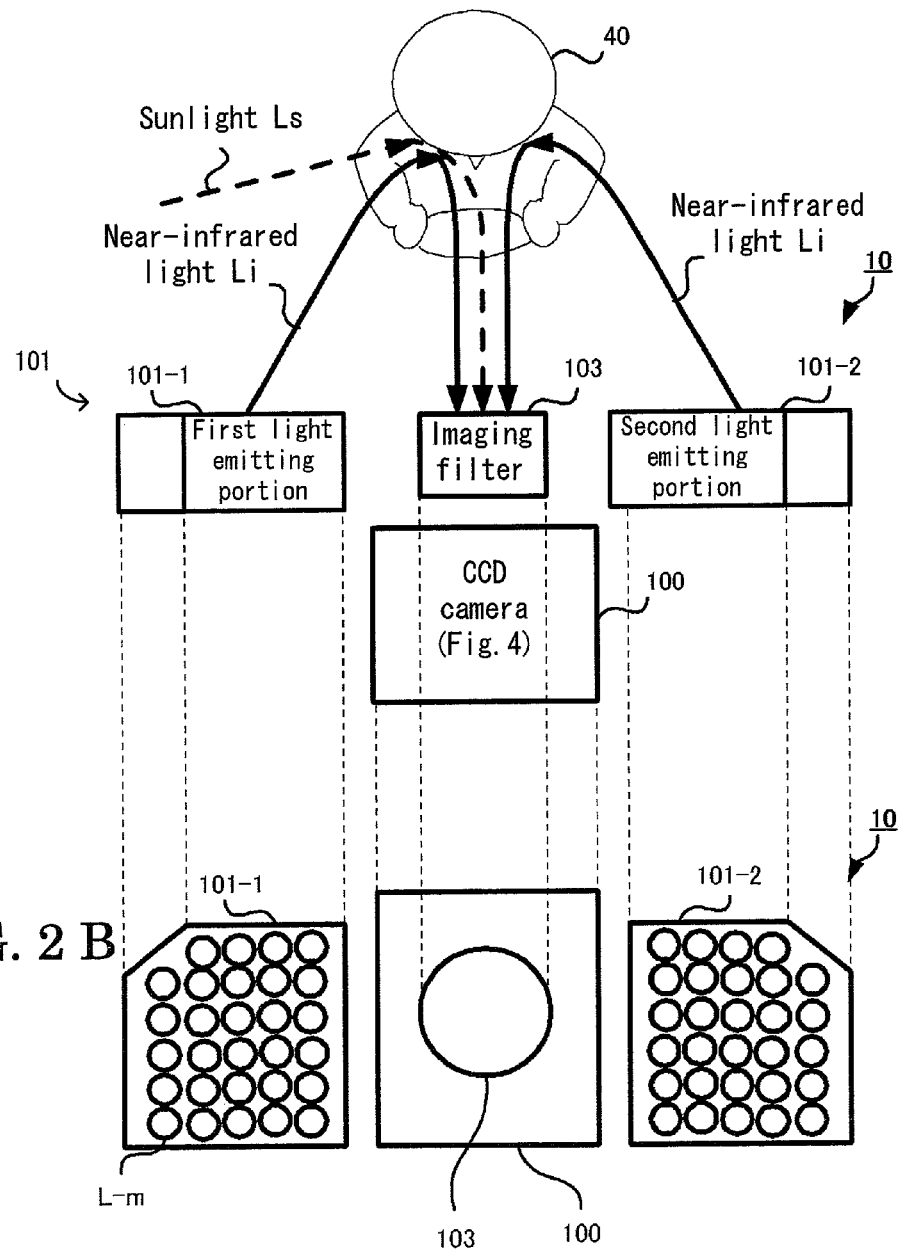
FIG. 2A illustrates a top view indicating an external appearance of the imaging apparatus.
FIG. 2B illustrates a front view indicating an external appearance of the imaging apparatus.

A basic configuration of the imaging apparatus 10 according to the third embodiment is similar to the example indicated in FIG. 2. A circuit configuration of the CCD camera 100 according to the third embodiment is similar to the example indicated in FIG. 4. The CCD camera 100 according to the third embodiment includes the memory 110 that stores setting information for imaging that is a characteristic of the third embodiment. Specifically, in the memory 110, direct sunlight control information 1101 and reflection on eyeglasses control information 1102 are stored. Examples of the direct sunlight control information 1101 are indicated by a table illustrated in FIG. 9A, and examples of the reflection on eyeglasses control information 1101 are indicated by a table illustrated in FIG. 9B.

The direct sunlight control information 1101 includes a plurality of ranges of light intensity RKm (m indicates an arbitrary integral number that is one or more) separated on the basis of the sunlight intensity. The direct sunlight control information 1101 further includes a plurality of direct sunlight control coefficients KDm used for calculating the infrared light intensity Ir that fulfills the direct light controlling condition. In the direct sunlight control information 1101, each range of light intensity RKm is associated with one of the direct sunlight control coefficients KDm. The controlling portion 109 selects one of the ranges of light intensity RKm corresponding to the sunlight intensity Is indicated by the data obtained by the inputting portion 113. Further, the controlling portion 109 finds the direct sunlight control coefficient KDm corresponding to the selected range of light intensity RKm, and the controlling portion 109 multiplies the sunlight intensity Is by the corresponding direct sunlight control coefficient KDm in order to calculate the infrared light intensity Ir that fulfills the direct light controlling condition.

The reflection on eyeglasses control information 1102 includes a plurality of ranges of light intensity RKm (m indicates an arbitrary integral number that is one or more) separated on the basis of the sunlight intensity. The reflection on eyeglasses control information 1102 further includes a plurality of reflection on eyeglasses control coefficients KGm used for calculating the infrared light intensity Ir that fulfills the reflection on eyeglasses controlling condition. In the reflection on eyeglasses control information 1102, each range of light intensity RKm is associated with one of the reflection on eyeglasses control coefficients KGm.

An actuation of the imaging apparatus 10 for obtaining the data of the sunlight intensity Is measured by the measuring device 20, for controlling the infrared light intensity Ir for the light emitting portion 101 and for taking the face image of the driver will be explained. In the third embodiment, the process in which the measuring device 20 measures the sunlight intensity Is is approximately identical to the example indicated in FIG. 6. In the third embodiment, the measured value is not displayed on the display panel or the like.

Figure 10:
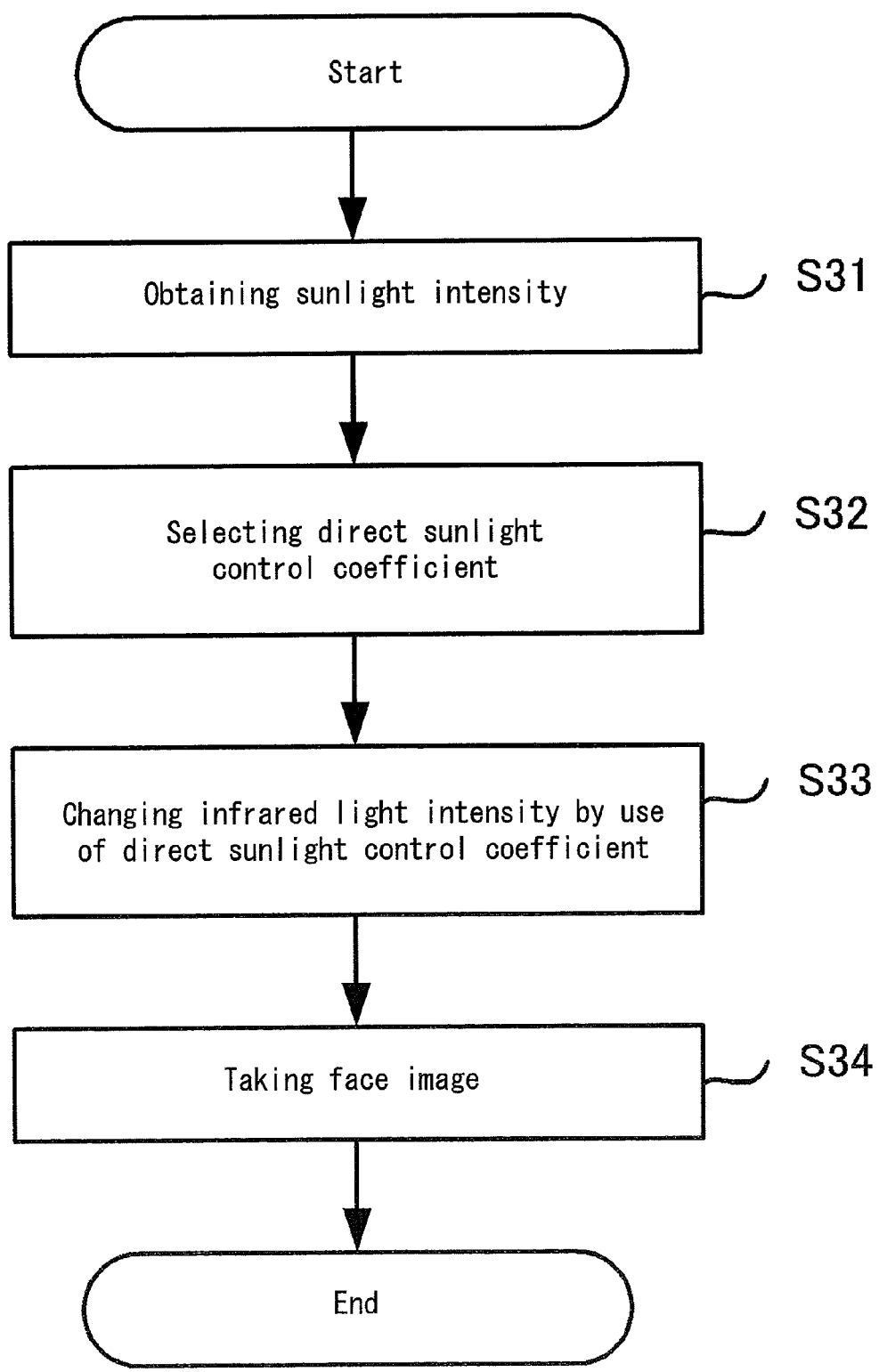
FIG. 10 illustrates a first flowchart indicating a light emission control and a imaging process when the imaging apparatus executes a direct sunlight control according to a third embodiment.

Firstly, an actuation for the direct sunlight control will be explained. As illustrated in FIG. 10, by means of the inputting portion 113, the controlling portion 109 of the imaging apparatus 10 obtains data that indicates the measured value of the sunlight intensity Is outputted by the measuring device 20 (Step S31, e.g., data obtaining portion).

Further, in reference to the direct sunlight control information 1101 indicated in the table illustrated in FIG. 9A, the controlling portion 109 applies the measured value of the sunlight intensity Is that is indicated by the data obtained in Step S31 to one of the ranges of light intensity RKm. The controlling portion 109 selects one of the direct sunlight control coefficient KDm that is associated with the applied range of light intensity RKm (Step S32, e.g., selecting portion). In the example indicated in FIG. 9A, when the sunlight intensity Is is 3000 uW/cm2, the range of light intensity RKm is 2800-3099. Accordingly, the controlling portion 109 selects "2" as the direct sunlight control coefficient KDm that is associated with the range of light intensity RKm of 2800-3099.

The controlling portion 109 multiplies the sunlight intensity Is (3000) obtained in Step S31 by the direct sunlight control coefficient KDm (2), and the controlling portion 109 controls the light emitting portion 101 so as to emit the light from the near-infrared LED at the value obtained by multiplying the infrared light intensity Ir by the direct sunlight control coefficient KDm (Step S33, e.g., calculating portion). Specifically, the controlling portion 109 controls the driving current for light emission supplied to each of the light emitting portions 101-1 and 101-2 by means of the LED drive control portion 102.

Then, the imaging portion 104 takes the face image of the driver per frame in a manner where the face of the driver is irradiated with the infrared light at the determined infrared light intensity Ir emitted from the near-infrared LED of each of the first and second light emitting portions 101-1 and 101-2 (Step S34), then the imaging portion 104 terminates the process.

Figure 11:
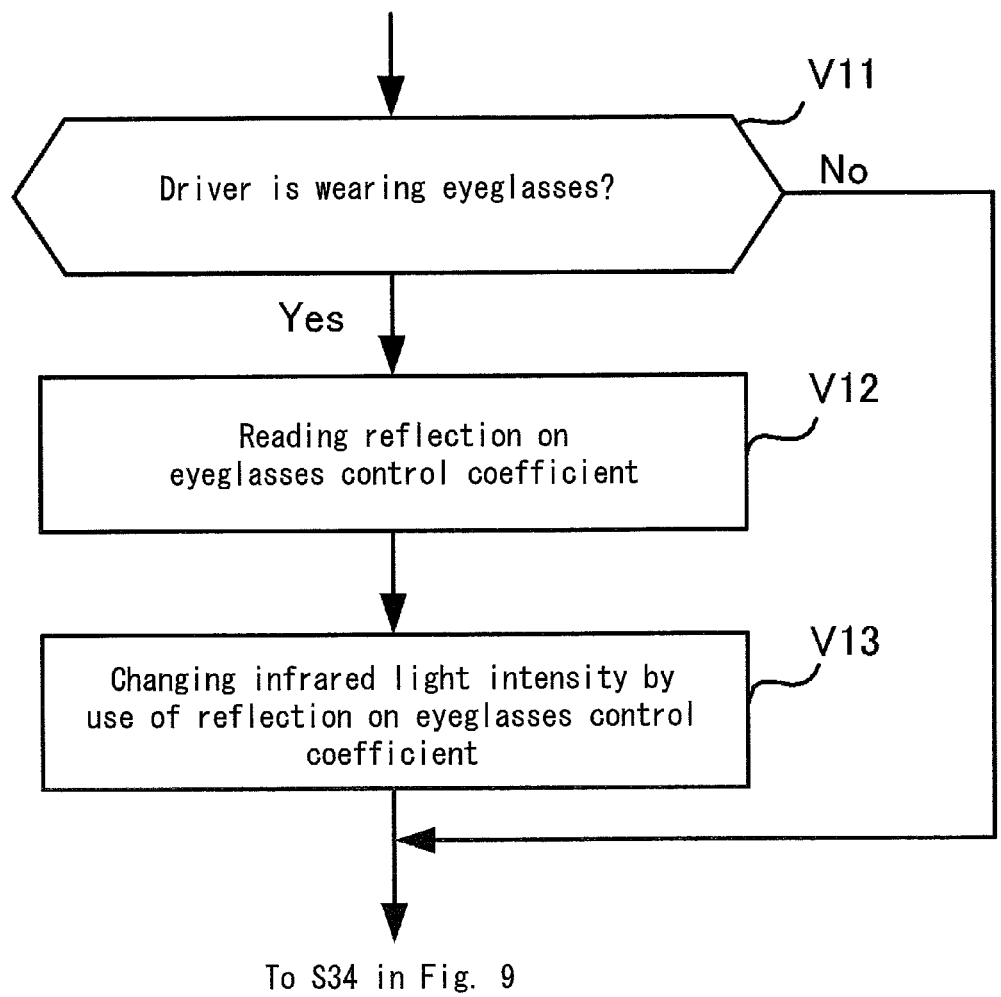
FIG. 11 illustrates a second flowchart indicating the light emission control and the imaging process when the imaging apparatus executes a reflection on eyeglasses control according to the third embodiment.

When the reflection on eyeglasses control is executed, a process of Steps V11 through V13 indicated in a flowchart illustrated in FIG. 11 may be executed instead of the process of Steps S32 through S 33 indicated in the flowchart illustrated in FIG. 10. in Through the process indicated by the flowchart illustrated in FIG. 11, after the data indicting the sunlight intensity Is is obtained, the controlling portion 109 determines whether or not the driver is wearing the eyeglasses. For example, the controlling portion 109 analyzes the image and determines an existence of a person who is wearing eyeglasses by use of a pattern matching by which a presence of an image that is similar to eyeglasses can be checked. When the controlling portion 109 determines that there is no existence of the person who is wearing eyeglasses (Step V11: No), the process returns to Step S34 in the flowchart illustrated in FIG. 10 and takes the face image of the driver 40.

When the controlling portion 109 determines that there is a person who is wearing the eyeglasses (Step V11: Yes), the controlling portion 109 applies the sunlight intensity Is to one of the range of light intensity RKm in the reflection on eyeglasses control information 1102 indicated by the table illustrated in FIG. 9B. Then, the controlling portion 109 selects the reflection on eyeglasses control coefficient KG that is associated with the range of light intensity RKm (Step V12) and multiples the sunlight intensity Is by the selected reflection on eyeglasses control coefficient KGm. Then, the controlling portion 109 controls the driving current for light emission supplied to the light emitting portions 101-1 and 101-2 so as to emit the light from the near-infrared LED at the infrared light intensity Ir multiplied by the direct sunlight control coefficient KDm (Step V13). Then, the process returns to the flowchart illustrated in FIG. 10 and takes the face image of the driver 40 (Step S34). Then, the controlling portion 109 terminates the process.

According to the third embodiment, the direct sunlight control coefficient KDm is selected in accordance with the sunlight intensity Is measured by the measuring device 20, and on the basis of the selected direct sunlight control coefficient KDm, the infrared light intensity Ir of the light emitting portion 101 is changed. Accordingly, even when the shade generated by the sunlight falls on the driver's face, influences of the shade may be dynamically reduced, as a result, the face image is appropriately taken. Further, because the direct sunlight control coefficient KDm is appropriately determined so as to be associated with the measured sunlight intensity, the influence caused by the direct sunlight may be reduced more effectively than that in the first embodiment.

According to the third embodiment, the existence of the person who is wearing the eyeglasses is determined, and when the person who is wearing the eyeglasses exists in the face image, the reflection on eyeglasses control coefficient KGm corresponding to the sunlight intensity Is measured by the measuring device 20 is automatically selected. Then, on the basis of the selected reflection on eyeglasses control coefficient KGm, the infrared light intensity Ir of the infrared light emitted from the light emitting portion 101 is changed. Thus, even when the indirect light reflected on, for example, the eyeglasses of the driver 40, enters the imaging portion 104, the influence caused by the indirect light may be dynamically reduced, as a result, the face image is appropriately taken. Further, because the direct sunlight control coefficient KDm is appropriately determined so as to be associated with the measured sunlight intensity, the influence caused by the indirect light may be reduced more effectively than that in the first embodiment.

The measured data outputting portion 204 of the measuring device 20 in not limited to the display device including a display panel, and the measured data outputting portion 204 may be a communicating device having a network interface. In this configuration, data indicating measured value of the sunlight intensity Is may be transmitted to the imaging apparatus 10 through a network. At this point, another interface may be provided at the imaging apparatus 10 in order to communicate with the measuring device 20. When the measuring device 20 is not mounted to the vehicle as in the example illustrated in FIG. 1, the imaging apparatus may communicate with the measuring device 20 by means of a wireless communication system via a wireless base station.

Further, the process indicated by the flowchart illustrated in FIG. 10 and the process indicated by the flowchart illustrated in FIG. 11 may be combined. For example, the light emitting portion 101 may be controlled so as to fulfill the direct light controlling condition after determining whether or not the reflection on eyeglasses control is needed. In this case, for example, the controlling portion 109 may determine an existence of a person who is wearing the eyeglasses in Step V11 in the flowchart illustrated in FIG. 11. If a person who is wearing the eyeglasses does not exist in the face image, the process returns to Step 32 in the flowchart illustrated in FIG. 10, and the direct sunlight control coefficient KDm is selected in Step S32.

Applicable Example 1 of the Third Embodiment

Figure 12:
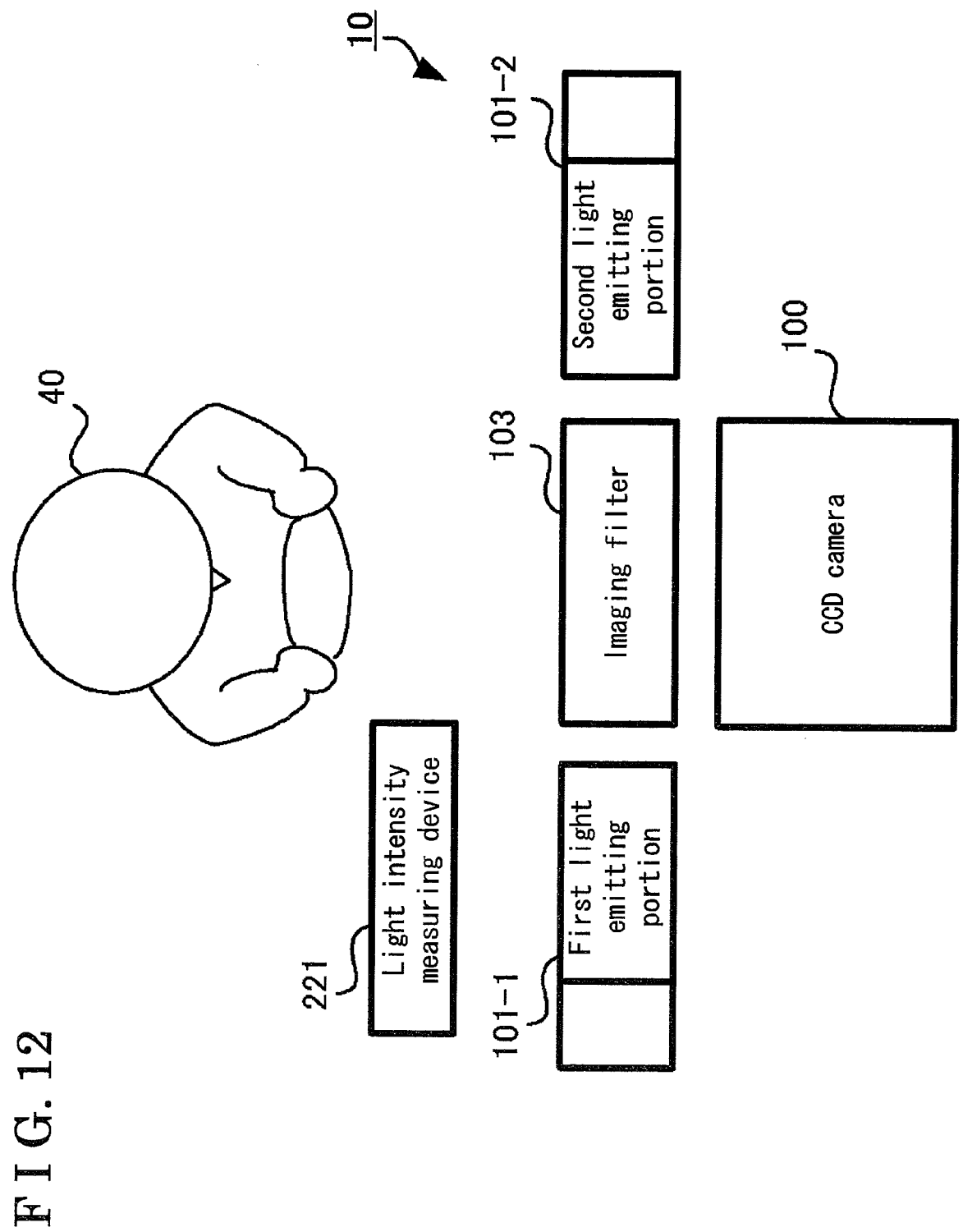
FIG. 12 illustrates a diagram indicating an applicable example of the imaging apparatus.

An applicable example 1 of the third embodiment will be explained. A configuration of the imaging apparatus of the applicable example is indicated in a drawing in FIG. 12. As illustrated in FIG. 12, a light intensity measuring device 221 (e.g., light intensity measuring portion) is positioned in the vicinity of the driver 40, specifically the light intensity measuring device 221 is positioned between the driver 40 and a front glass or a door glass. The light intensity measuring device 221 measures a light intensity (luminance) of a visible light range and outputs the measured light intensity as a measured value Iv.

Figure 4:
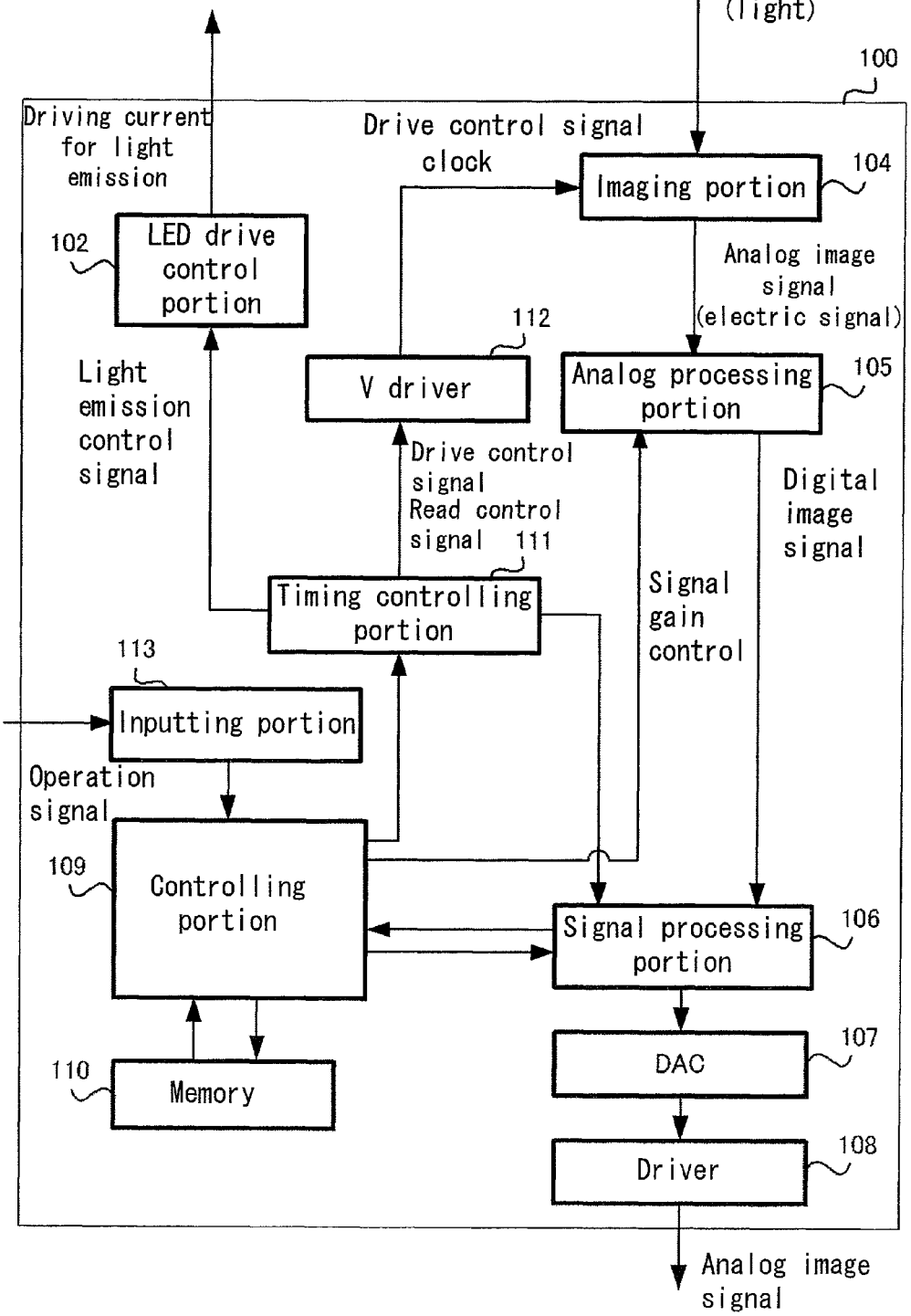
FIG. 4 illustrates a diagram indicating a circuit configuration of a CCD camera provided at the imaging apparatus.

The LED drive control portion 102 indicated by the drawing in FIG. 4 includes a controller 102a and a memory 102b. The memory 102b stores a light emission controlling table 211 indicated by a table illustrated in FIG. 14. The light emission controlling table 211 memorizes the light intensity (measured value Iv) detected by the light intensity measuring device 221 and light emission conditions for the light emitting portions 101-1 and 101-2. The light intensity (measured value Iv) is associated with one of the light emission conditions.

In the example indicated in FIG. 14, the light emission controlling table 211 associates the light intensity (measured value Iv) of the visible light with a LED number that is to be lighted, a lighting time (conducting time) T and a current value I supplied to each LED. The light emission controlling table 211 is set at the design stage as follows. First, the CCD camera 100 takes the face images under a variety of circumstances where parameters of the LED, the lighting time and the current value are changed, and the face images are evaluated. On the basis of those parameters and the evaluated face images, the light emission controlling table 211 is set so that a dark shadow of the sun visor does not fall on the image (small amount of shadow falls on the image).

Figure 13:
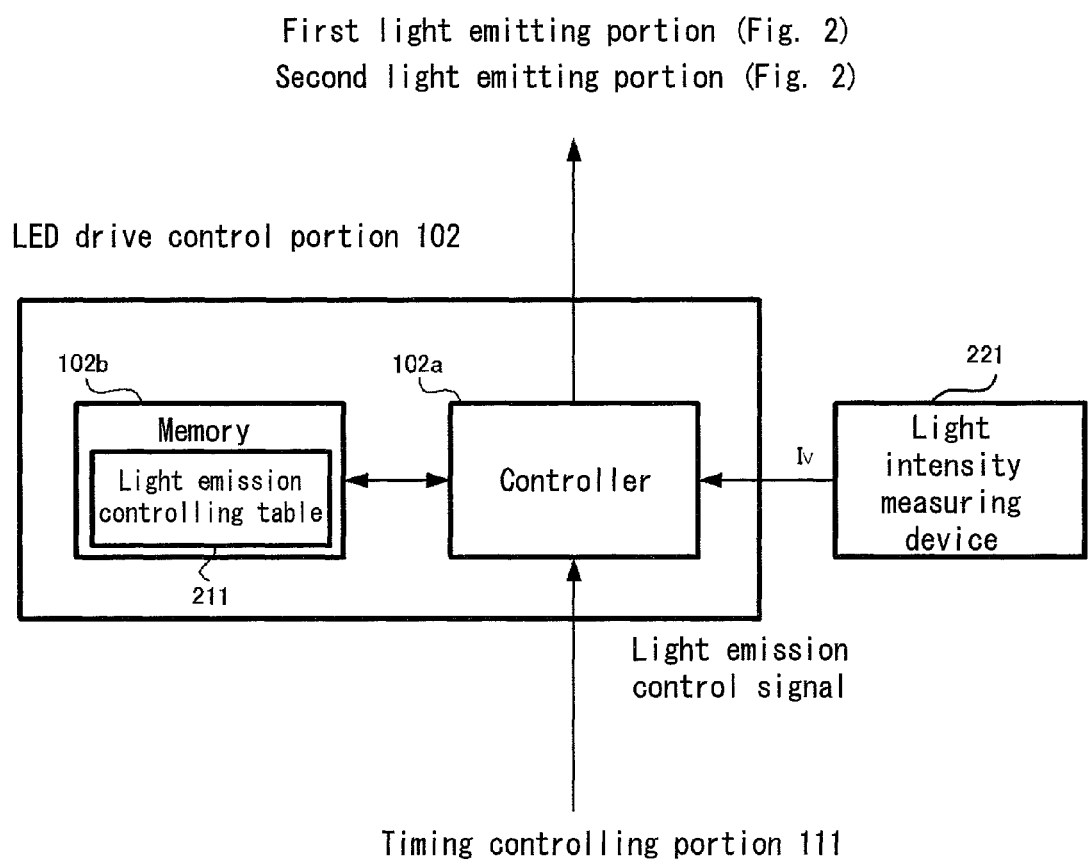
FIG. 13 illustrates a diagram indicating a relation between a LED drive control portion and a light intensity measuring device.

As illustrated in FIG. 13, the measured value Iv indicating the light intensity measured by the light intensity measuring device 221 is supplied to the controller 102a. Responding to the measured value Iv, on the basis of the measured light intensity, the controller 102a reads the light emission controlling table 211 and obtains identification information (Number) of the LED that is to be lighted (to which the electric current is supplied), the lighting time (conducting time) T and the current value I. On the basis of the obtained information, the controller 102a controls the LED of the light emitting portions 101-1 and 101-2 so as to be turned on or off (controlling the electric current supply).

Next, the actuation of the imaging apparatus will be explained. The driver is exposed to an external light including the sunlight, and an intensity of partial reflected light is reduced by means of the imaging filter 103, and the filtered light enters the CCD camera 100. The light intensity measuring device 221 measures the light intensity of the visible light that reaches in the vicinity of the driver 40, and the light intensity measuring device 221 supplies the measured value Iv indicating the measured light intensity to the controller 102a of the LED drive control portion 102.

The controller 102a of the LED drive control portion 102 periodically accesses the memory 102b and reads information corresponding to the measured value in reference to the light emission controlling table 211.

Once the light emission control signal is supplied from the timing controlling portion 111 to the LED drive control portion 102, the LED drive control portion 102 supplies an electric current at the current value Iv for the lighting time T to the selected LED so as to be lighted. The near-infrared light emitted by the light emitting portions 101-1 and 101-2 irradiates the driver 40, and partial near-infrared light reflecting on the driver 40 passes through the imaging filter 103 and enters the CCD camera 100. The intensity of the near-infrared light is slightly reduced by the imaging filter 103.

At this point, the light entering the CCD camera 100 includes the external light (mainly a visible light) such as the sunlight whose intensity is reduced by means of the imaging filter 103 and the near-infrared light emitted from the light emitting portions 101-1 and 101-2 and reflected on the driver 40. An intensity of the near-infrared light reflected on the driver 40 is slightly reduced by means of the imaging filter 103.

The light emission controlling table 211 is set in a manner where intensities of the visible light and the infrared light entering the CCD camera 100 fulfill the formulas 1 and 2, in other word, the light emission controlling table 211 is set in a manner where a ratio between the visible light (sunlight) entering the CCD camera 100 and the near-infrared light emitted from the light emitting portions 101-1 and 101-2 exists in an appropriate range.

While the vehicle is traveling, and when the condition of the external light has changed as an external environment has changed, the light intensity (measured value Iv) measured by the light intensity measuring device 221 has also varied. Accordingly, a reference entry in the light emission controlling table 211 sequentially changes so as to correspond to the measured value, and the number, a position, a lighting time and an intensity of the LED of the light emitting portions 101-1 and 101-2 to be lighted also vary.

For example, as an intensity of the external light (sunlight) increases, the number of the LED to be lighted is increased, or the amount of luminescence per LED is increased. Accordingly the amount of the near-infrared light entered into the CCD camera 100 also increases, as a result, an image having little shade may be obtained.

On the other hand, as the intensity of the external light (sunlight) decreases, the number of the LEDs to be lighted is decreased, or the amount of luminescence per LED is decreased. Accordingly the amount of the near-infrared light entered into the CCD camera 100 also decreases, however, an image having little shade may also be obtained. The light emission controlling table 211 is designed in a manner where the amount of luminescence does not fall below a predetermined reference level. Because of this light emission controlling table 211, the CCD camera 100 is allowed to take the image of the driver's face even where the external light intensity is zero in the darkness of night.

In this configuration, an appropriate image having no shade (little shade due to the sunlight) may be obtained even when the external environment changes. Thus, an imaging process is appropriately executed using this image.

Applicable Example 2 of the Third Embodiment

In the above embodiments, the light intensity measuring device 221 is located in the vicinity of the driver 40 in order to monitor the amount of the external light, however, the light intensity measuring device 221 may be located at a different place.

Figure 15:
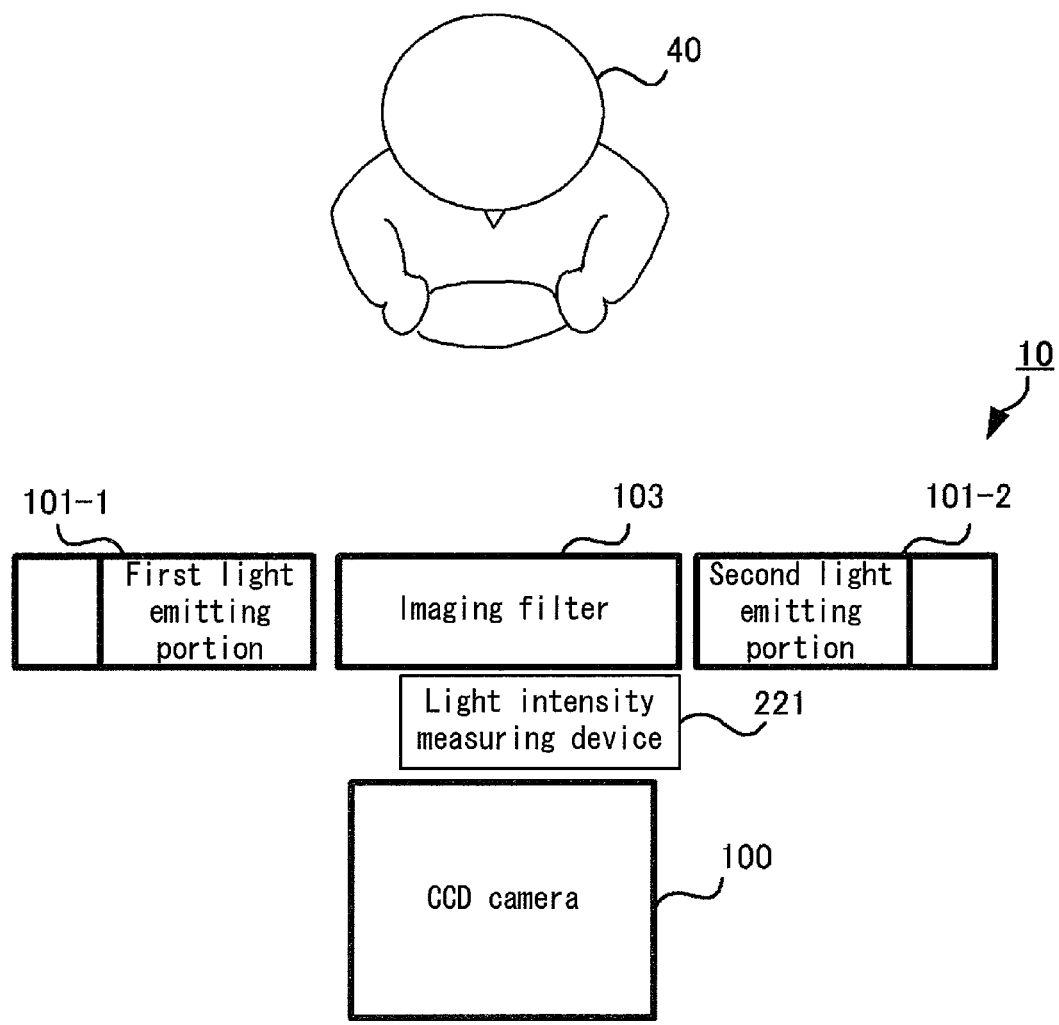
FIG. 15 illustrates a diagram indicating an applicable example of the imaging apparatus and FIG. 16 illustrates a diagram indicating a relation between the LED drive control portion and the light intensity measuring device.
Figure 16:
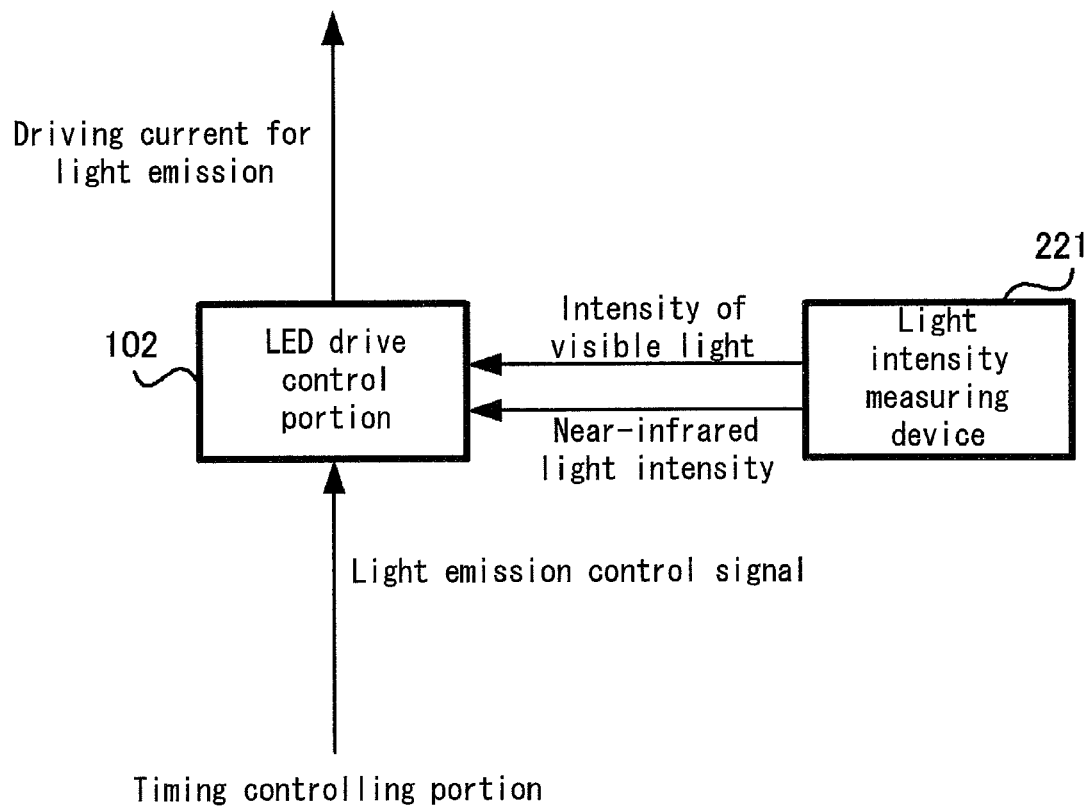

For example, as indicated by the drawing illustrated in FIG. 15, the light intensity measuring device 221 may be positioned behind the imaging filter 103. The light intensity measuring device 221 positioned behind the imaging filter 103 separately measures each of the visible light intensity passing through the imaging filter 103 and the near-infrared light intensity passing through the imaging filter 103. Then, as indicated by the drawing illustrated in FIG. 16, the light intensity measuring device 221 supplies each measured value to the LED drive control portion 102.

The LED drive control portion 102 controls the light emitting portions 101-1 and 101-2 so as to fulfill the formulas 1 and 2 by use of the measured visible light intensity and the measured near-infrared light intensity.

For example, when a ratio between the visible light intensity and the near-infrared light intensity is below the reference level, the LED drive control portion 102 controls the light emitting portions 101-1 and 101-2 so as to increase the amount of the light being emitted. On the other hand, when the ratio between the visible light intensity and the near-infrared light intensity is equal to or lager than the reference level, the LED control portion 102 controls the light emitting portions 101-1 and 101-2 so as to decrease the amount of the light being emitted.

For example, when the ratio does not reach the reference level, the number of the LED to be lighted is increased by a natural number n, the lighting time is extended by $\Delta t$ when it is possible, or the driving current is increased by $\Delta I$. On the other hand, when the ratio exceeds the reference level, the number of the LED to be lighted is decreased by a natural number n, the lighting time is shortened by $\Delta t$ when it is possible, or the driving current is decreased by $\Delta I$.

The LED drive control portion 102 periodically executes the above setting and drives the light emitting portions 101-1 and 101-2 by following the setting each time the light emission control signal is received. Accordingly, even when the intensity of the external light has drastically changed, the light emitting portion s 101-1 and 101-2 can deal with the change in few cycles.

Further, a difference E between the ratio of the reference level and the actual ratio is calculated, on the basis of the difference E, a proportional control, a proportional-integral control and a proportional-integral-derivative control may be executed in order to change the amount of the light being emitted. Further, in the above example, the light intensity measuring device 221 is provided behind the imaging filter 103, however, the light intensity measuring device 221 may be positioned at any place where the light reflected on the driver 40 and entered into the light intensity measuring device 221 has a similar characteristic to that entered into the CCD camera 100. In this case, another optical filter having a similar characteristic to the imaging filter 103 needs to be provided in front of the light intensity measuring device 221.

Further, in the example indicated in the drawing illustrated in FIG. 12, the light intensity measuring device 221 may be positioned behind the imaging filter 103. In this case, no additional filter for the light intensity measuring device 221 is provided. In this configuration, because the light intensity measuring device 221 measures an intensity of a visible light reflected on the driver 40, the light emission controlling table 221 needs to be designed in view of this configuration.

An application of the above embodiments is not limited to a computer system for exclusive use, and it may be applied to a variety of electric devices having a camera such as a cellular phone, PDA (personal digital assistance) and the like. A program created for a computer to function and actuate as the imaging apparatus 10 is created, and this program may be distributed or rent the program so as to be installed into the computer functioning and actuating as the imaging apparatus 10, and the computer may be used, rent or given.

According to the embodiments, the near-infrared light irradiating portion (101-1, 101-2) irradiates the face with the near-infrared light at a predetermined intensity determined on the basis of an intensity of an external light passing through a measuring filter (201) having a similar characteristic to the imaging filter (103).

According to the embodiments, the imaging apparatus (10) further includes a light intensity measuring portion (221) for measuring one of an intensity of a visible light in the vicinity of the face, an intensity of a visible light passing through the imaging filter (103) and an intensity of a visible light passing through a measuring filter (201), and on the basis of the intensity measured by the light intensity measuring portion (221), a level of an intensity of the near-infrared light to be emitted from the near-infrared light irradiating portion (101-1, 101-2) is controlled.

According to the embodiments, the near-infrared light irradiating portion (101-1, 101-2) includes a light emitting element (L-m) for emitting the near-infrared light, a LED drive control portion (102) for supplying a light emitting drive pulse to drive the light emitting element (L-m) so as to emit the near-infrared light, a timing controlling portion (111) for controlling the LED drive control portion (102) to start supplying the light emitting drive pulse, the timing controlling portion (111) for controlling the LED drive control portion (102) to end supplying the light emitting drive pulse, a controlling portion (109) for controlling the imaging element (100) to start being exposed so as to correspond to the start of the supply of the light emitting drive pulse from the LED drive control portion, and the controlling portion (109) for controlling the imaging element (100) to end being exposed so as to correspond to the end of the supply of the light emitting drive pulse from the LED drive control portion.

According to the embodiments, the near-infrared light irradiating portion (101-1, 101-2) further includes a data obtaining portion (S31) for obtaining data indicating an intensity of a sunlight passing through the imaging filter (103), assuming that the sunlight passes through the imaging filter (103) in the vicinity of the face, a memorizing portion (110) for memorizing a plurality of ranges of light intensity (RKm) of the sunlight whose intensity of a visible light is reduced by means of the imaging filter (103) and for memorizing predetermined values each of which corresponds to one of the ranges of light intensity (Rkm), a selecting portion (S32) for selecting one of the ranges of light intensity (RKm) in which the data obtained by the data obtaining portion exists and for selecting one of the predetermined values that corresponds to the selected range of light intensity (RKm) and a calculating portion (S33) for multiplying the intensity of the sunlight by the predetermined value selected by the selecting portion, the intensity of the sunlight being indicated by the data obtained by the data obtaining portion, and the near-infrared light irradiating portion (101-1, 101-2) irradiates the face with the near-infrared light at a level that corresponds to the value calculated by the calculating portion.

According to the embodiments, the near-infrared light irradiating portion irradiates the face with the near-infrared light whose intensity is set so as to be equal to or more than twice the intensity of the sunlight passing through the imaging filter (103) in the vicinity of the face so that an influence due to a shade generated on the face by the sunlight is reduced.

According to the embodiments, the near-infrared light irradiating portion irradiates the face with the near-infrared light whose intensity is set so as to be equal to or more than ⅙ the intensity of the sunlight passing through the imaging filter (103) in the vicinity of the face so that an influence due to the sunlight reflected on a reflector existing in the vicinity of the face and entering the imaging apparatus is reduced.

According to the embodiments, the lighting apparatus for imaging further includes plural housings each of which includes plural light emitting elements, the housings being positioned so as to be symmetrical relative to the imaging apparatus.

According to the embodiments, the face includes a face of a driver of a vehicle.

Thus, when the image of the face is taken by means of the camera having the sensitivity for the near-infrared range and the visible range, while the visible optical element in the light is reduced by means of the optical filter, the face of the driver is irradiated with the near-infrared light. Thus, even when the shade is made on the face due to the external light, a proportion of the near-infrared light becomes greater than that of the external light when the image of the face is taken by the camera. Accordingly, influences due to the shade may be reduced, as a result, the image of the face is appropriately taken.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. An imaging apparatus for taking an image of a face, comprising:
    an imaging element having sensitivity for a near-infrared range and a visible range;
    a first optical filter provided between the face and the imaging element to reduce an intensity of a visible light entering the imaging element;
    a near-infrared light irradiating portion for irradiating the face with a near-infrared light,
    wherein the near-infrared light irradiating portion is configured to irradiate the face with the near-infrared light at a predetermined intensity determined on the basis of one of an intensity of a visible light in the vicinity of the face, an intensity of a visible light passing through the first optical filter and an intensity of a visible light passing through a second optical filter having a similar characteristic to the first optical filter; and
    a light intensity measuring portion for measuring one of the intensity of the visible light in the vicinity of the face, the intensity of the visible light passing through the first optical filter and the intensity of the visible light passing through the second optical filter, and on the basis of the intensity measured by the light intensity measuring portion, a level of an intensity of the near-infrared light to be emitted from the near-infrared light irradiating portion is controlled;
    the light intensity measuring portion configured such that the intensity of the near-infrared light is increased when the measured intensity of the visible light increases; and the intensity of the near-infrared light is decreased when the measured intensity of the visible light decreases.

2. The imaging apparatus according to claim 1, wherein the near-infrared light irradiating portion includes:
    a light emitting element for emitting the near-infrared light;
    a LED drive control portion for supplying a light emitting drive pulse to drive the light emitting element so as to emit the near-infrared light;
    a timing controlling portion for controlling the LED drive control portion to start supplying the light emitting drive pulse;
    the timing controlling portion for controlling the LED drive control portion to end supplying the light emitting drive pulse;
    a controlling portion for controlling the imaging element to start being exposed so as to correspond to the start of the supply of the light emitting drive pulse from the LED drive control portion; and
    the controlling portion for controlling the imaging element to end being exposed so as to correspond to the end of the supply of the light emitting drive pulse from the LED drive control portion.

3. The imaging apparatus according to claim 1, wherein the near-infrared light irradiating portion further includes:
    a data obtaining portion for obtaining data indicating an intensity of a sunlight passing through the first optical filter, assuming that the sunlight passes through the first optical filter in the vicinity of the face;
    a memorizing portion for memorizing a plurality of ranges of light intensity of the sunlight whose intensity of a visible light is reduced by means of the first optical filter and for memorizing predetermined values each of which corresponds to one of the ranges of light intensity;
    a selecting portion for selecting one of the ranges of light intensity in which the data obtained by the data obtaining portion exists and for selecting one of the predetermined values that corresponds to the selected range of light intensity; and
    a calculating portion for multiplying the intensity of the sunlight by the predetermined value selected by the selecting portion, the intensity of the sunlight being indicated by the data obtained by the data obtaining portion, and the near-infrared light irradiating portion irradiates the face with the near-infrared light at a level that corresponds to the value calculated by the calculating portion.

4. A lighting apparatus for imaging irradiating a face taken by an imaging apparatus to which a first optical filter is provided at an imaging surface thereof to reduce an intensity of a visible light, the lighting apparatus for imaging including
    a near-infrared light irradiating portion for irradiating the face with a near-infrared light at a predetermined intensity being set on the basis of an intensity of a sunlight, assuming that the sunlight passes through the first optical filter in the vicinity of the face; and
    a light intensity measuring portion for measuring the intensity of the sunlight, and on the basis of the intensity measured by the light intensity measuring portion, a level of an intensity of the near-infrared light to be emitted from the near-infrared light irradiating portion is controlled.

5. The lighting apparatus for imaging according to claim 4, wherein the near-infrared light irradiating portion irradiates the face with the near-infrared light whose intensity is set so as to be equal to or more than twice the intensity of the sunlight passing through the first optical filter in the vicinity of the face so that an influence due to a shade generated on the face by the sunlight is reduced.

6. The lighting apparatus for imaging according to claim 4, wherein the near-infrared light irradiating portion irradiates the face with the near-infrared light whose intensity is set so as to be equal to or more than one-sixth the intensity of the sunlight passing through the first optical filter in the vicinity of the face so that an influence due to the sunlight reflected on a reflector existing in the vicinity of the face and entering the imaging apparatus is reduced.

7. The lighting apparatus for imaging according to claim 4 further including plural housings each of which includes plural light emitting elements, the housings being positioned so as to be symmetrical relative to the imaging apparatus.

8. The lighting apparatus for imaging according to claim 5 further including plural housings each of which includes plural light emitting elements, the housings being positioned so as to be symmetrical relative to the imaging apparatus.

9. The lighting apparatus for imaging according to claim 6 further including plural housings each of which includes plural light emitting elements, the housings being positioned so as to be symmetrical relative to the imaging apparatus.

10. The imaging apparatus according to claim 1, wherein the face includes a face of a driver of a vehicle.

11. The lighting apparatus for imaging according to claim 4, wherein the face includes a face of a driver of a vehicle.

* * * * *